United States Patent [19]
Limberg

[11] Patent Number: 5,835,131
[45] Date of Patent: Nov. 10, 1998

[54] DIGITAL TELEVISION RECEIVER WITH ADAPTIVE FILTER CIRCUITRY FOR SUPPRESSING NTSC CO-CHANNEL INTERFERENCE

[75] Inventor: Allen L. Limberg, Vienna, Va.

[73] Assignee: Samsung Electronics Co., Ltd., Suwon, Rep. of Korea

[21] Appl. No.: 839,691

[22] Filed: Apr. 15, 1997

[51] Int. Cl.[6] ...................................................... H04N 5/38
[52] U.S. Cl. ............................ 348/21; 348/607; 375/350; 375/348
[58] Field of Search ............................. 348/21, 470, 607, 348/731, 845.1; 375/346, 348, 349, 350

[56] References Cited

U.S. PATENT DOCUMENTS

| 5,087,975 | 2/1992 | Citta et al. | 358/183 |
|---|---|---|---|
| 5,132,797 | 7/1992 | Citta et al. | 358/167 |
| 5,162,900 | 11/1992 | Citta et al. | 358/167 |
| 5,512,957 | 4/1996 | Hulyalkar | 348/21 |
| 5,546,132 | 8/1996 | Kim et al. | 348/607 |
| 5,594,496 | 1/1997 | Nielsen et al. | 348/21 |
| 5,602,602 | 2/1997 | Hulyalkar | 348/607 |
| 5,636,251 | 6/1997 | Citta et al. | 375/341 |

Primary Examiner—Victor R. Kostak

[57] ABSTRACT

Co-channel interference accompanying multiple-level symbols in a digital receiver, such as a digital television receiver, is suppressed by using a first comb filter to reduce the energy of the co-channel interference before data slicing. The first comb filter incidentally precodes the symbol decoding results generated by the data slicing. A second comb filter postcodes the precoded symbol decoding results from the data slicing to generate corrected symbol decoding results. The symbol precoding of the input symbol stream results from differential delay and first linear combination of the differentially delayed terms. The postcoding of the symbol stream recovered by data slicing results from second linear combination of the symbol stream with delayed result of the second linear combination, and is performed in accordance with a modular arithmetic. One of the first and second linear combinations is subtractive, and the other is additive. The results of the second linear combination are the corrected symbol decoding results.

28 Claims, 13 Drawing Sheets

ONE OF 1ST & 2ND LINEAR COMBINERS IS A SUBTRACTOR & THE OTHER IS AN ADDER

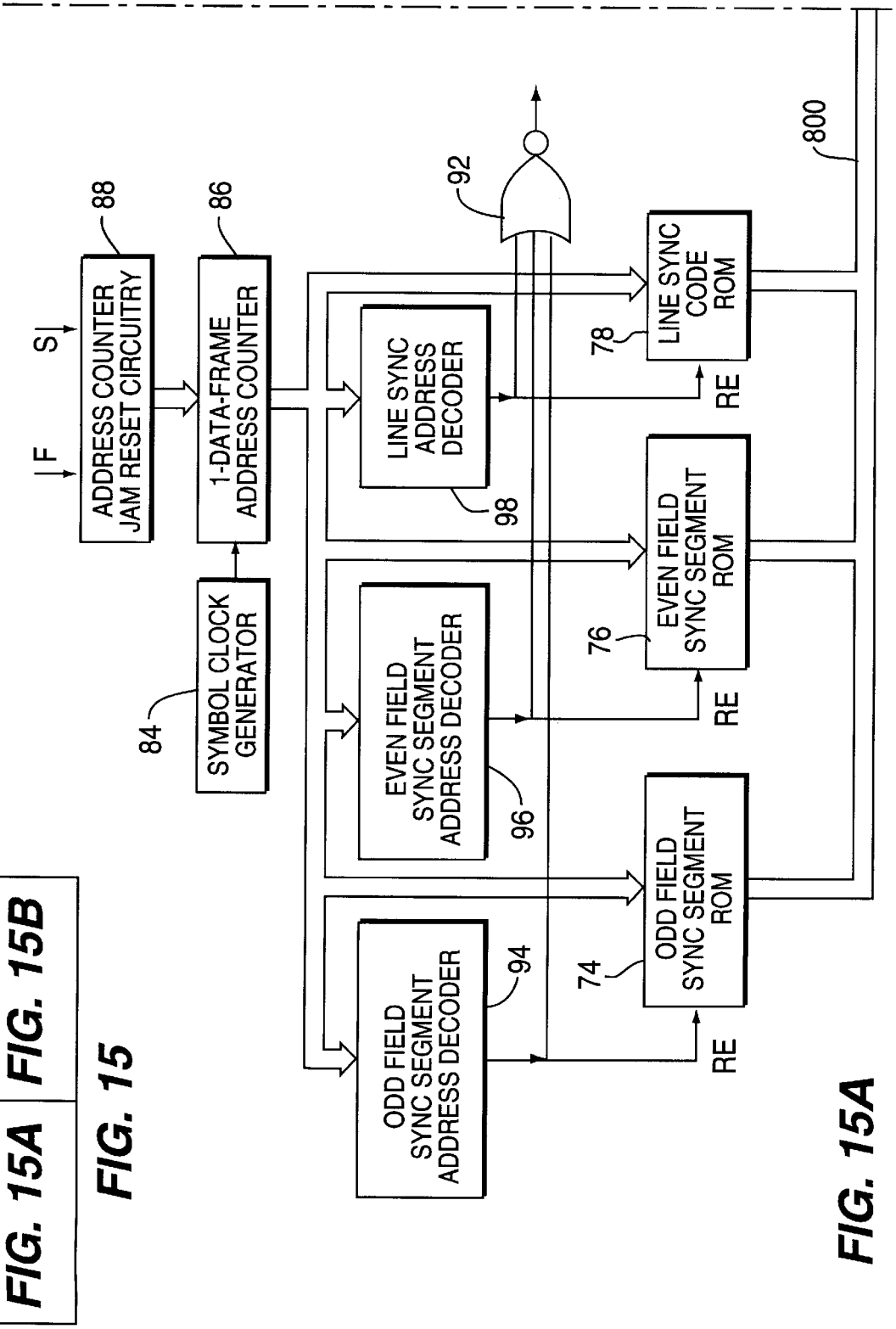

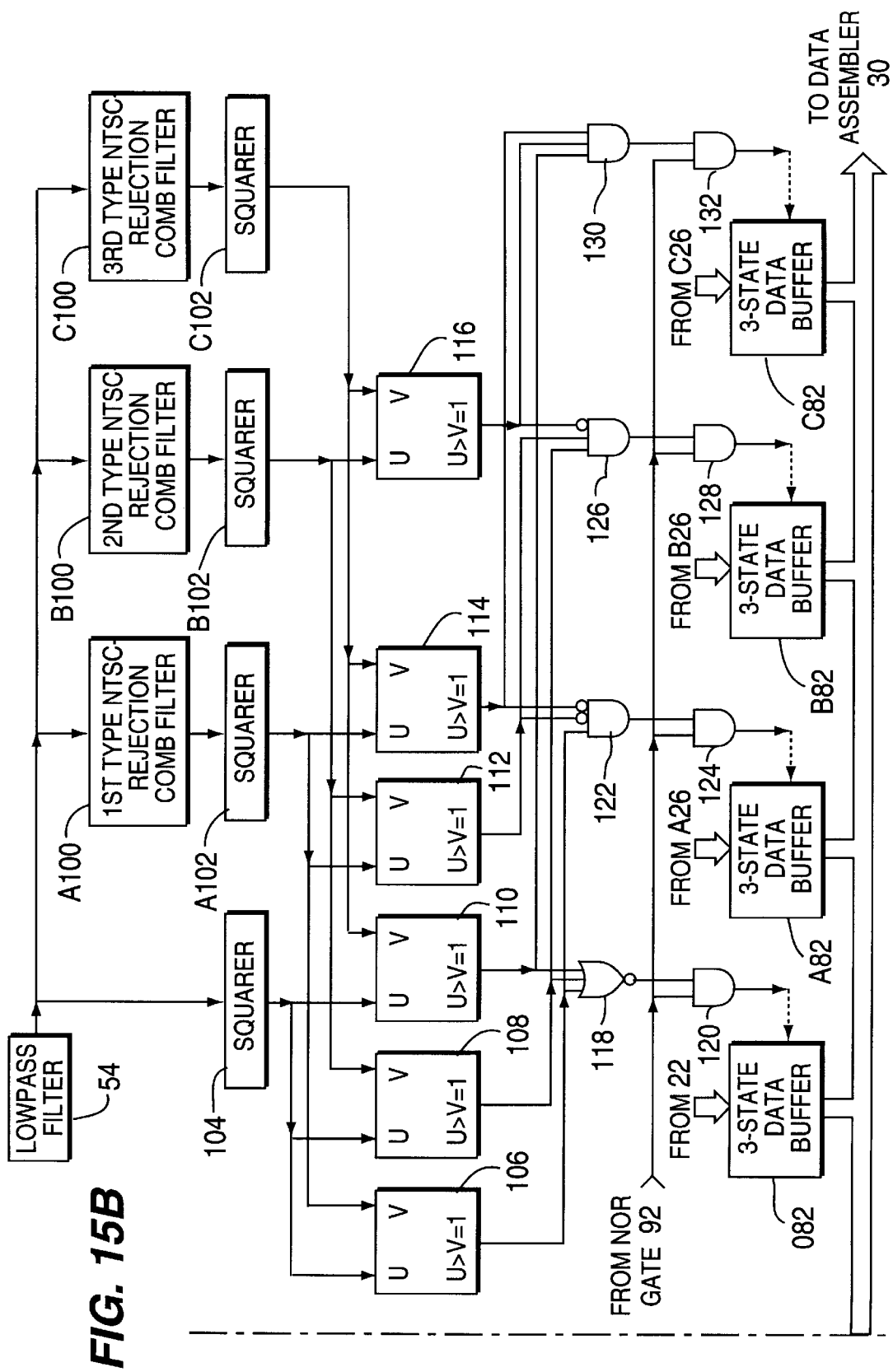

DIGITAL TELEVISION RECEIVER WITH ADAPTIVE FILTER CIRCUITRY FOR SUPPRESSING NTSC CO-CHANNEL INTERFERENCE

The present invention relates to digital television systems, such as the digital high-definition television (HDTV) system used for terrestrial broadcasting in the United States of America in accordance with the Advanced Television System Committee (ATSC) standard, and more particularly, to digital television receivers with adaptive filter circuitry for suppressing co-channel interference from analog television signals, such as those conforming to the National Television Systems Committee (NTSC) standard.

BACKGROUND OF THE INVENTION

A Digital Television Standard published 16 Sep., 1995 by the Advanced System Committee (ATSC) specifies vestigial sideband (VSB) signals for transmitting digital television (DTV) signals in 6-MHz-bandwidth television channels such as those currently used in over-the-air broadcasting of National Television System Committee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel.

The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is $10.762238*10^6$ symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV display format uses 1920 samples per scan line and 1080 active horizontal scan lines per 30 Hz frame with 2:1 field interlace. The other HDTV display format uses 1280 luminance samples per scan line and 720 progressively scanned scan lines of television image per 60 Hz frame. The ATSC standard also accommodates the transmission of DTV display formats other than HDTV display formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. The data fields may be considered to be consecutively numbered modulo-2, with each odd-numbered data field and the succeeding even-numbered data field forming a data frame. The frame rate is 20.66 frames per second. Each data segment is of 77.3 microseconds duration. So, with the symbol rate being 10.76 MHz there are 832 symbols per data segment. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-random noise sequence (or "PN-sequence") followed by three 63-sample PN sequences. The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a ⅔ rate trellis code with one uncoded bit. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission, which transmissions are made without symbol precoding separate from the trellis coding procedure. The Reed-Solomon coding results are transmitted as 16-level (4 bits/symbol) one-dimensional-constellation symbol coding for cablecast, which transmissions are made without precoding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized valve of 1.25. The normalized value of +S is +5, and the normalized value of −S is −5.

In the earlier development of the DVT art it was contemplated that the DTV broadcaster might be called upon to decide whether or not to use a symbol precoder at the transmitter, which symbol precoder would follow the symbol generation circuitry and provide for precoded filtering of symbols. This decision by the broadcaster would have depended upon whether interference from a co-channel NTSC broadcasting station were expected or not. The symbol precoder would complement the symbol postcoding incidentally introduced in each DTV receiver by a comb filter used before the data-slicer in the symbol decoder circuitry to reject artifacts of NTSC co-channel interfering signal. Symbol precoding would not have been used for data line synchronization code groups or during data lines in which data field synchronization data were transmitted.

Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not occur if there are no co-channel NTSC broadcasting stations, of course. If there were likelihood of NTSC interference within his area of broadcast coverage, it was presumed that the HDTV broadcaster would use the symbol precoder to facilitate the HDTV signal being more easily separated from NTSC interference; and, accordingly, a comb filter would be employed as symbol postcoder in the DTV receiver to complete matched filtering. If there were no possibility of NTSC interference or there were insubstantial likelihood thereof, in order that flat spectrum noise would be less likely to cause erroneous decisions as to symbol values in the trellis decoder, it was presumed that the DTV broadcaster would discontinue using the symbol precoder; and, accordingly, the symbol postcoder would then be disabled in each DTV receiver. Without the broadcaster being aware of the condition, actual co-channel NTSC interference can be substantial for portions of the reception area for a broadcast, owing to freakish skip conditions, owing to cablecast leakage, owing to inadequate intermediate-frequency image suppression in NTSC receivers, owing to magnetic tape used for digital television recording having remnant previous analog television recording, or owing to some other unusual condition.

The current ATSC DTV standard does not authorize the transmitter to use symbol preceding. The suppression of co-channel interfering analog TV signal is presumed to be carried out in the trellis decoding process, after the data-slicing procedures associated with symbol decoding. This procedure avoids the problem of determining whether or not precoding is done at the transmitter. However, co-channel interfering analog TV signal undesirably introduces errors into the data-slicing processes, which places more burden on the error-correction decoding procedures, trellis decoding and Reed-Solomon decoding. These errors will reduce the broadcast coverage area, which may lose revenue for the commercial DTV broadcaster. So, providing for the suppression of co-channel interfering analog TV signal before data-slicing is still desirable, despite symbol precoding at the DTV transmitter not being authorized by the current ATSC DTV standard.

The term "linear combination" refers generically to addition and to subtraction, whether performed in accordance with a conventional arithmetic or a modular arithmetic. The term "modular combination" refers to linear combination carried performed in accordance with a modular arithmetic. That type of coding that re-codes a digital symbol stream through differential delay and linear combination of the differentially delayed terms, exemplified by the symbol postcoding used in prior-art HDTV receivers, is defined as "symbol re-coding of first type" in this specification. That type of coding that re-codes a digital symbol stream through its modular combination with delayed result of the modular combination, exemplified by the symbol precoding used in prior-art HDTV transmitters, is defined as "symbol re-coding of second type" in this specification.

The problem of co-channel interference from analog television signals can be viewed from the standpoint of being a sometime jamming problem at the receiver, to be solved by adaptive filter circuitry in the receiver. So long as the dynamic range of the system channel is not exceeded, so that the co-channel interference can capture the system channel by destroying signal transmission capability for DTV modulation, the performance of the system can be viewed as a superposition of signals problem. The filter circuitry in the receiver is adapted for selecting the digital signal from the co-channel interference caused by the analog television signals, relying on the pronounced correlation and anti-correlation properties of the analog television signals to reduce their energy sufficiently as to capture the system channel from them.

Insofar as the co-channel interference from analog television signals is concerned, it enters the system channel after the DTV transmitter and before the DTV receiver. The use or non-use of symbol preceding at the DTV transmitter has no effect on the co-channel interference from analog television signals. At the DTV receiver, so long as the co-channel interference is not so large as to overload the receiver front-end and capture the system channel, it is advantageous to precede the data-slicing circuitry with a comb filter for reducing the energy of higher-energy spectral components of the co-channel interference, thus to reduce the errors occurring during data-slicing. The DTV broadcaster should adjust his carrier frequency, which is nominally 310 KHz above the lower limit frequency of the television channel assignment, so that his carrier frequency is optimally offset in frequency from the video carrier of a co-channel NTSC analog TV signal that is likely to interfere. This optimal offset in carrier frequency is exactly 59.75 times the horizontal scan line frequency $f_H$ of the NTSC analog TV signal. The artifacts of the co-channel interference in the demodulated DTV signal will then include beats at 59.75 times the horizontal scan line frequency $f_H$ of the NTSC analog TV signal, generated by heterodyne between the digital HDTV carrier and the video carrier of the co-channel interfering analog TV signal, and beats at 287.25 times $f_H$, generated by heterodyne between the digital HDTV carrier and the chrominance subcarrier of the co-channel interfering analog TV signal, which beats are quite close in frequency to the fifth harmonic of the beats at 59.75 times $f_H$. The artifacts will further include beats at approximately 345.75 times $f_H$, generated by heterodyne between the digital HDTV carrier and the audio carrier of the co-channel interfering analog TV signal, which beats are quite close in frequency to the sixth harmonic of the beats at 59.75 times $f_H$. The nearly harmonic relationship of these beats allows them all to be suppressed by a single properly designed comb filter incorporating only a few symbol epochs of differential delay. The use of an NTSC-rejection comb filter before data-slicing in the DTV receiver incidentally performs symbol re-coding of first type, to modify the symbols obtained by data-slicing.

The data-slicing operation that follows this symbol re-coding of first type in the DTV receiver is a quantizing process that is not destructive of the symbols resulting from the symbol re-coding of first type, insofar as the transmission of data is concerned, since the data quantization levels are designed to match the symbol levels. The quantization discriminates against the co-channel interfering analog TV signal remnants that remain after the filtering associated with symbol re-coding of first type and that are appreciably smaller than steps between symbol code levels, however. This is a species of the capture phenomenon in which phenomenon a stronger signal gains at the expense of a weaker one in a quantizing process.

Insofar as the transmission of data is concerned, the digital data symbol stream flows through the full length of the system channel. When symbol re-coding of second type is done as symbol preceding at the DTV transmitter, the additive combination of the differentially delayed data symbol streams is done on a modular basis that does not boost transmitter power or increase average intersymbol distance to help further in overcoming jamming analog TV signal. Instead, the principal mechanism for overcoming jamming analog TV signal is its attenuation vis-a-vis DTV signal, as provided by the comb filtering at the DTV receiver, causing the remnant analog TV signal in the comb filter response to be suppressed by the quantizing effects in the data-slicer that immediately follows the comb filter.

The order of performing symbol re-coding procedures of first and second types has no appreciable effect on signal transmission through the system channel under such circumstances, since neither coding scheme destroys signal transmission capability for the symbol stream. The order of performing symbol re-coding procedures of first and second types has no appreciable affect on the capability of the digital receiver to suppress co-channel interfering analog TV signal, as long as symbol re-coding of the second type is not interposed between symbol re-coding of the first type and the subsequent data-slicing. These insights provide the general foundation on which the invention is based.

Co-channel interference accompanying multiple-level symbols in a digital receiver, such as a digital television receiver, is suppressed by using a first comb filter to reduce the energy of the co-channel interference before data-slicing. The first comb filter is supplied a stream of 2N-level symbols each having a symbol epoch of a specified length in time, which stream of 2N-level symbols is susceptible to being accompanied by artifacts of co-channel interfering analog television signal, and supplies a response in which those artifacts of co-channel interfering analog television signal are suppressed should they obtain.

The first comb filter incidentally carries out a symbol re-coding procedure of first type that introduces error into the symbol decoding results generated by the data-slicing. Suppose the first comb filter delays the stream of 2N-level symbols by a prescribed number of symbol epochs to generate a delayed stream of 2N-level symbols, then linearly combines the stream of 2N-level symbols and the delayed stream of 2N-level symbols to generate first linear combining results as the response of the first comb filter. This response, which has (4N−1)-level symbols, is supplied to a first data-slicer.

In the context of the invention, this symbol re-coding procedure of first type carried out before data-slicing by the first data-slicer is viewed as a precoding procedure. A second comb filter carries out a symbol re-coding procedure of second type after the data-slicing, implementing a postcoding procedure to compensate for the symbol re-coding procedure of first type and generate corrected symbol decoding results. The symbol re-coding procedure of first type re-codes an input symbol stream through differential delay and first linear combination of the differentially delayed terms. The symbol re-coding procedure of second type re-codes partially-filtered symbol decoding results recovered by the first data-slicer. This symbol re-coding procedure of second type utilizes second linear combination of the partially-filtered symbol decoding results with delayed result of the second linear combination and is performed in accordance with a modular arithmetic. One of the first and second linear combinations is subtractive, and the other is additive. The results of the second linear combination are postcoded symbol decoding results.

The postcoding done subsequent to comb filtering and data-slicing has a basic problem that must be solved in order for the postcoding to operate properly. One aspect of this problem is that once error occurs in the partially-filtered symbol decoding results, the error is fed back with delay, tending to propagate the error during the generation of postcoded symbol decoding results. Other aspects of this problem concern how to initialize the conditions in the delayed feedback circuitry and how to re-initialize the conditions in the delayed feedback circuitry once error propagation occurs.

This problem arises when re-coding of the second type is used for postcoding because the feedback used in such re-coding is accumulative and provides a sort of integration over time. When re-coding of the second type is done during preceding and re-coding of the first type is done during postcoding, the re-coding of the first type provides a sort of differentiation over time that quickly suppresses response to the initial conditions of the re-coding of second type. One does not have to concern oneself with the initial conditions of accumulation or integration. When re-coding of the first type is done during precoding and re-coding of the second type is done during postcoding, error caused by incorrect initial conditions of accumulation or integration in the re-coding of second type propagate themselves during postcoding. The resulting running error in the final decoding results is a systematic error, rather than a random error, so generally speaking the running error will not be able to self-correct itself by chance.

SUMMARY OF THE INVENTION

An aspect of the invention is a method of symbol decoding a stream of 2N-level symbols each having a symbol epoch of a specified length in time, which stream of 2N-level symbols is susceptible to being accompanied by artifacts of co-channel interfering analog television signal, N being a positive integer. The method generates selected symbol decoding results by steps including a step of comb filtering the stream of 2N-level symbols to generate a comb filter response with (4N−1)-level precoded symbols from which the artifacts of co-channel interfering analog television signal, if any, are suppressed. This step of comb filtering includes substeps of delaying the stream of 2N-level symbols by a prescribed number of symbol epochs to generate a delayed stream of 2N-level symbols and linearly combining the stream of 2N-level symbols and the delayed stream of 2N-level symbols, in accordance with one of additive and subtractive procedures, to generate first linear combining results as the comb filter response with (4N−1)-level precoded symbols. There is a step of data-slicing the comb filter response with (4N−1)-level precoded symbols to generate precoded symbol decoding results. There are steps of delaying the selected symbol decoding results by the prescribed number of symbol epochs to generate delayed selected symbol decoding results, and linearly combining the precoded symbol decoding results with the delayed selected symbol decoding results to generate second linear combining results. The linear combining done to generate second linear combining results is done in accordance with an opposite of the additive and subtractive procedures from the one used in the substep of linear combining done to generate first linear combining results, an is performed according to a modular arithmetic. There are steps of determining when symbol coding descriptive of synchronization data occurs in the stream of 2N-level symbols, of regenerating the synchronization data without error when the symbol coding descriptive of said synchronization data occurs in the stream of 2N-level symbols, and of generating the selected symbol decoding results so as to correspond to the synchronization data without error when the symbol coding descriptive of synchronization data occurs in the stream of 2N-level symbols and so as to correspond to the second linear combining results at least during selected times when symbol coding that is not descriptive of the synchronization data occurs in the stream of 2N-level symbols.

An aspect of the invention is a combination of circuitry, as described in this paragraph, which circuitry is included within a digital television receiver. The combination includes digital television signal detection apparatus for supplying a stream of 2N-level symbols each having a symbol epoch of a specified length in time, which stream is susceptible to being accompanied by artifacts of co-channel interfering analog television signal. The combination includes first and second delay devices, each exhibiting a delay of a prescribed first number of said symbol epochs. The combination includes first and second linear combiners, one of which is an adder and the other of which is a subtractor, the second linear combiner operating in a modulo-2N arithmetic. The first delay device is connected to respond to the stream of 2N-level symbols with a first delayed stream of 2N-level symbols, thereby to generate a first pair of differentially delayed streams of said 2N-level symbols. The first linear combiner is connected for linearly combining the first pair of differentially delayed streams of the 2N-level symbols, which are received as first and second respective input signals of the first linear combiner. Responsive to these input signals the first linear combiner generates a first stream of (4N−1)-level symbols as its output signal. A first data-slicer is included in the combination for generating first precoded symbol decoding results by decoding the first stream of (4N−1)-level symbols supplied as respective output signal from the first linear combiner. The second linear combiner, for linearly combining respective first and second input signals received thereby for supplying a respective output signal therefrom, is connected to receive the first precoded symbol decoding results as a respective first input signal thereof. The second delay device is connected for delaying a respective input signal thereof to generate the second input signal of the second linear combiner. The combination further includes data synchronization circuitry for determining when symbols used for data synchronization appear in the stream of 2N-level symbols and circuitry for generating ideal symbol decoding results when symbols used for data synchronization are determined to appear in the stream of 2N-level symbols. The combination further includes a plural-input first multiplexer connected for supplying a respective output signal therefrom to the second delay device as the respective input signal thereof, for receiving the ideal symbol decoding results as a first of its input signals, and for receiving the output signal of the second linear combiner as another of its input signals. The first multiplexer is conditioned to reproduce as its output signal the first of its input signals when and only when symbols used for data synchronization are determined to appear in the stream of 2N-level symbols. Otherwise the first multiplexer is conditioned, at least at selected times, to reproduce the output signal of the second linear combiner as first postcoded symbol decoding results.

9

Figure 14:
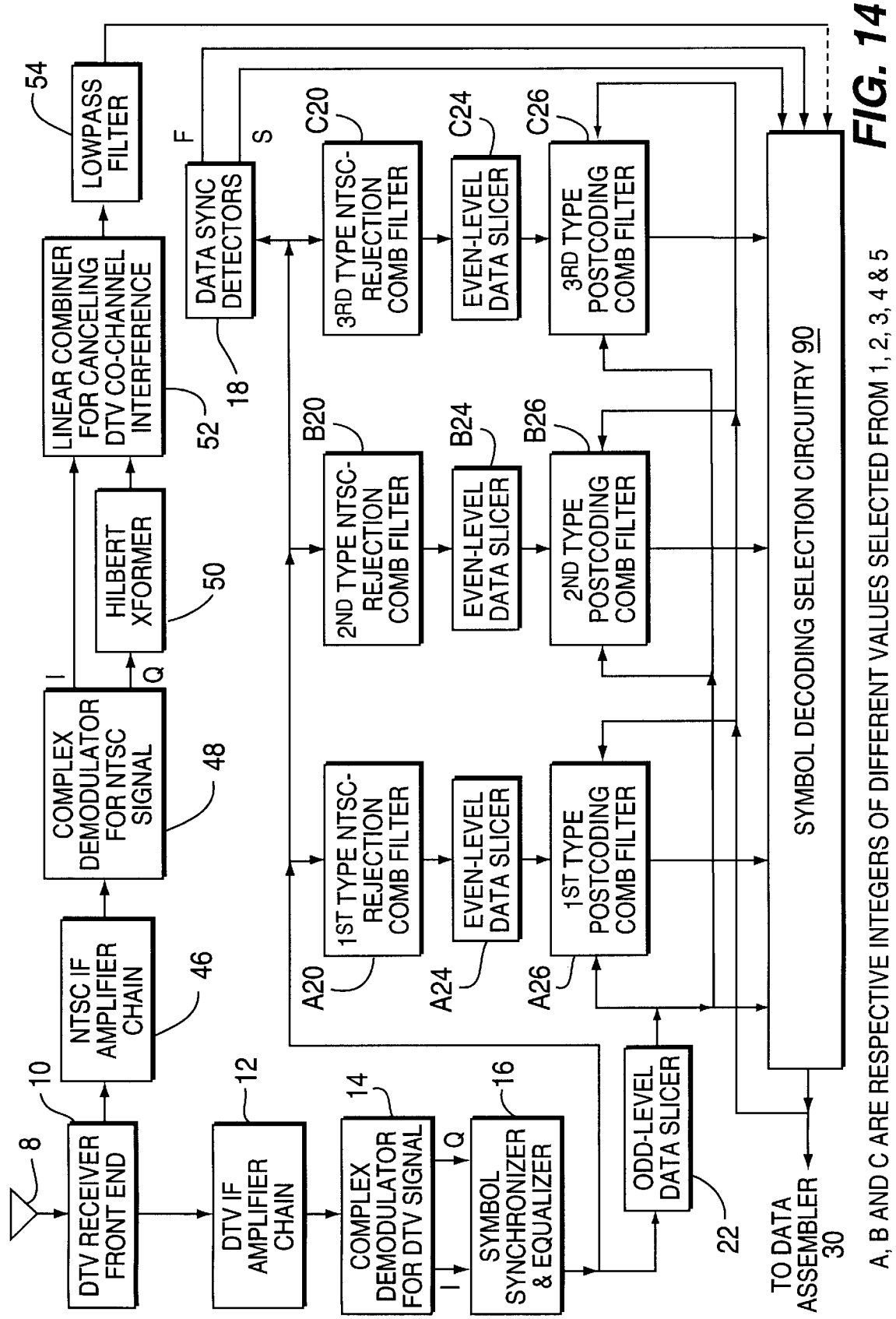
FIG. 14 is a block schematic diagram showing a digital television signal receiver using a plurality of NTSC-rejection comb filters for performing parallel symbol decoding.

FIG. 15 is an assembly diagram showing how FIGS. 15A and 15B can be fitted together to form a single figure referred to as FIG. 15 in the detailed description that follows, which FIG. 15 shows details of symbol code selection circuitry that can be used in a digital television signal receiver of the type shown in FIG. 14.

FIG. 15A is a block schematic diagram showing details of circuitry in the FIG. 14 digital television signal receiver for generating prescribed symbol decoding results during data synchronization intervals.

FIG. 15B is a block schematic diagram showing details of circuitry in the FIG. 14 digital television signal receiver for selecting among symbol decoding results during time periods between data synchronization intervals.

DETAILED DESCRIPTION

At various points in the circuits shown in the FIGURES of the drawing, shimming delays have to be inserted in order that the sequence of operation is correct, as will be understood by those skilled in electronic design. Unless there is something out of the ordinary about a particular shimming delay requirement, it will not be explicitly referred to in the specification that follows.

Figure 1:
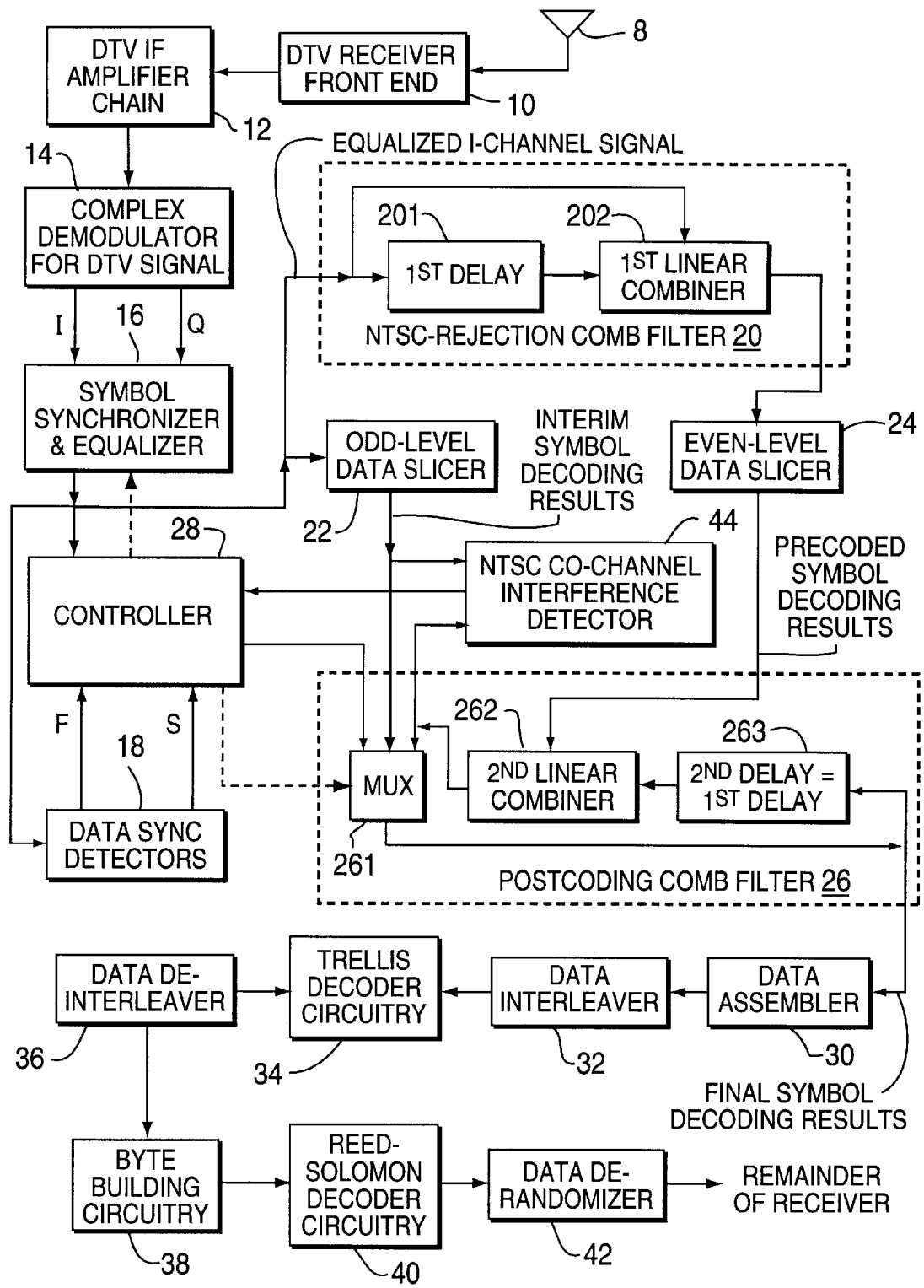
FIG. 1 is a block schematic diagram of a digital television signal receiver using an NTSC-rejection comb filter before symbol decoding and a postcoding comb filter after symbol decoding, in accordance with the invention, and using a co-channel interference detector that compares the symbol decoding results obtained without taking measures to suppress NTSC co-channel interference with symbol decoding results obtained by taking measure to suppress NTSC co-channel interference.

FIG. 1 shows a digital television signal receiver used for recovering error-corrected data, which data are suitable for recording by a digital video cassette recorder or for MPEG-2 decoding and display in a television set. The FIG. 1 DTV signal receiver is shown as receiving television broadcast signals from a receiving antenna 8, but can receive the signals from a cable network instead. The television broadcast signals are supplied as input signal to "front end" electronics 10. The "front end" electronics 10 generally include a radio-frequency amplifier and first detector for converting radio-frequency television signals to intermediate-frequency television signals, supplied as input signal to an intermediate-frequency (I-F) amplifier chain 12 for vestigial-sideband DTV signals. The DTV receiver is preferably of plural-conversion type with the IF amplifier chain 12 including an intermediate-frequency amplifier for amplifying DTV signals as converted to an ultra-high-frequency band by the first detector, a second detector for converting the amplified DTV signals to a very-high-frequency band, and a further intermediate-frequency amplifier for amplifying DTV signals as converted to the VHF band. If demodulation to baseband is performed in the digital regime, the IF amplifier chain 12 will further include a third detector for converting the amplified DTV signals to a final intermediate-frequency band closer to baseband.

Preferably, a surface-acoustic-wave (SAW) filter is used in the IF amplifier for the UHF band, to shape channel selection response and reject adjacent channels. This SAW filter cuts off rapidly just beyond 5.38 MHz remove from the suppressed carrier frequency of the VSB DTV signal and the pilot carrier, which is of like frequency and of fixed amplitude. This SAW filter accordingly rejects much of the frequency-modulated sound carrier of any co-channel interfering analog TV signal. Removing the FM sound carrier of any co-channel interfering analog TV signal in the IF amplifier chain 12 prevents artifacts of that carrier being generated when the final I-F signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by relying on comb-filtering before data-slicing.

10

The final I-F output signals from the IF amplifier chain 12 are supplied to a complex demodulator 14, which demodulates the vestigial-sideband amplitude-modulation DTV signal in the final intermediate-frequency band to recover a real baseband signal and an imaginary baseband signal. Demodulation may be done in the digital regime after analog-to-digital conversion of a final intermediate-frequency band in the few megacycle range as described for example by C. B. Patel et alii in U.S. Pat. No. 5,479,449 issued 26 Dec., 1995 and entitled "DIGITAL VSB DETECTOR WITH PHASE TRACKER, AS FOR INCLUSION IN AN HDTV RECEIVER". Alternatively, demodulation may be done in the analog regime, in which case the results are usually subjected to analog-to-digital conversion to facilitate further processing. The complex demodulation is preferably done by in-phase (I) synchronous demodulation and quadrature-phase (Q) synchronous demodulation. The digital results of the foregoing demodulation procedures conventionally have 8-bit accuracy or more and describe 2N-level symbols that encode N bits of data. Currently, 2N is eight in the case where the FIG. 1 DTV signal receiver receives a through-the-air broadcast via the antenna 12 and is sixteen in the case where the FIG. 1 DTV signal receiver receives cablecast. The concern of the invention is with the reception of terrestrial through-the-air broadcasts, and FIG. 1 does not show the portions of the DTV receiver providing symbol decoding and error-correction decoding for received cablecast transmissions.

Symbol synchronizer and equalizer circuitry 16 receives at least the digitized real samples of the in-phase (I-channel) baseband signal from the complex demodulator 14; in the FIG. 1 DTV receiver the circuitry 16 is shown also receiving the digitized imaginary samples of the quadrature-phase (Q-channel) baseband signal. The circuitry 16 includes a digital filter with adjustable weighting coefficients that compensates for ghosts and tilt in the received signal. The symbol synchronizer and equalizer circuitry 16 provides symbol synchronization or "de-rotation" as well as amplitude equalization and ghost removal. Symbol synchronizer and equalizer circuitry in which symbol synchronization is accomplished before amplitude equalization is known from U.S. Pat. No. 5,479,449. In such designs the demodulator 14 will supply oversampled demodulator response containing real and imaginary baseband signals to the symbol synchronizer and equalizer circuitry 16. After symbol synchronization, the oversampled data are decimated to extract baseband I-channel signal at normal symbol rate, to reduce sample rate through the digital filtering used for amplitude equalization and ghost removal. Symbol synchronizer and equalizer circuitry in which amplitude equalization precedes symbol synchronization, "de-rotation" or "phase tracking" is also known to those skilled in the art of digital signal receiver design.

Each sample of the circuitry 16 output signal is resolved to ten or more bits and is, in effect, a digital description of an analog symbol exhibiting one of (2N=8) levels. The circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal supplied from the complex demodulator 14 to a normalized level of +1.25. This method of gain control is generally described in U.S. Pat. No. 5,479,449 and is more specifically described by C. B. Patel et alii in U.S. patent application Ser. No. 5,573,454 filed 15 Dec., 1995, issued 3 Jun., 1997 as U.S. Pat. No. 5,636,252 entitled "AUTOMATIC GAIN CONTROL OF RADIO RECEIVER FOR RECEIVING DIGITAL HIGH-DEFINITION TELEVISION SIGNALS", and incorporated herein by reference.

The output signal from the circuitry 16 is supplied as input signal to data sync detection circuitry 18, which recovers data field synchronization information F and data segment synchronization information S from the equalized baseband I-channel signal. Alternatively, the input signal to data sync detection circuitry 18 can be obtained prior to equalization.

The equalized I-channel signal samples at normal symbol rate supplied as output signal from the circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronizer and equalizer circuitry 16 is presumed be designed to suppress the direct bias component of its input signal (as expressed in digital samples), which direct bias component has a normalized level of +1.25 and appears in the real baseband signal supplied from the complex demodulator 14 owing to detection of the pilot carrier. Accordingly, each sample of the circuitry 16 output signal applied as comb filter 20 input signal is, in effect, a digital description of an analog symbol exhibiting one of the following normalized levels: −7, −5, −3, −1, +1, +3, +5 and +7. These symbol levels are denominated as "odd" symbol levels and are detected by an odd-level data-slicer 22 to generate interim symbol decoding results of 000, 001, 010, 011, 100, 101, 110 and 111, respectively.

Each sample of the comb filter 20 output signal is, in effect, a digital description of an analog symbol exhibiting one of the following normalized levels: −14, −12, −10, −8, −6, −4, −2, 0, +2, +4, +6, +8, +10, +12 and +14. These symbol levels are denominated as "even" symbol levels and are detected by an even-level data-slicer 24 to generate precoded symbol decoding results of 001, 010, 011, 100, 101, 110, 111, 000, 001, 010, 011, 100, 101, 110, and 111, respectively.

The data-slicers 22 and 24 can be of the so-called "hard decision" type, as presumed up to this point in the description, or can be of the so-called "soft decision" type used in implementing a Viterbi decoding scheme. Arrangements are possible in which the odd-level data-slicer 22 and the even-level data-slicer 24 are replaced by a single data-slicer, using multiplexer connections to shift its place in circuit and to provide bias to modify its slicing ranges, but these arrangements are not preferred because of the complexity of operation.

The symbol synchronizer and equalizer circuitry 16 is presumed in the foregoing description to be designed to suppress the direct bias component of its input signal (as expressed in digital samples), which direct bias component has a normalized level of +1.25 and appears in the real baseband signal supplied from the complex demodulator 14 owing to detection of the pilot carrier. Alternatively, the symbol synchronizer and equalizer circuitry 16 is designed to preserve the direct bias component of its input signal, which simplifies the design of the equalization filter in the circuitry 16 somewhat. In such case the data-slicing levels in the odd-level data-slicer 22 are offset to take into account the direct bias component accompanying the data steps in its input signal. Providing that the first linear combiner 202 is a subtractor, whether the circuitry 16 is designed to suppress or to preserve the direct bias component of its input signal has no consequence in regard to the data-slicing levels in the even-level data-slicer 24. However, if the differential delay provided by the first delay device 201 is chosen so that the first linear combiner 202 is an adder, the data-slicing levels in the even-level data-slicer 24 should be offset to take into account the doubled direct bias component accompanying the data steps in its input signal.

A comb filter 26 is used after the data-slicers 22 and 24 to generate a postcoding filter response to the precoding filter response of the comb filter 20. The comb filter 26 includes a 3-input multiplexer 261, a second linear combiner 262, and a second delay device 263 with delay equal to that of the first delay device 201 in the comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved. The output signal from the multiplexer 261 furnishes the response from the postcoding comb filter 26 and is delayed by the second delay device 263. The second linear combiner 262 combines precoded symbol decoding results from the even-level data-slicer 24 with the output signal from the second delay device 263.

The output signal of the multiplexer 261 reproduces one of the three input signals applied to the multiplexer 261, as selected in response to first, second and third states of a multiplexer control signal supplied to the multiplexer 261 from a controller 28. The first input port of the multiplexer 261 receives ideal symbol decoding results supplied from memory within the controller 28 during times when data field synchronization information F and data segment synchronization information S from the equalized baseband I-channel signal are recovered by the data sync detection circuitry 18. The controller 28 supplies the first state of the multiplexer control signal to the multiplexer 261 during these times, conditioning the multiplexer 261 to furnish, as the final coding results which are its output signal, the ideal symbol decoding results supplied from memory within the controller 28. The odd-level data-slicer 22 supplies interim symbol decoding results as its output signal to the second input port of the multiplexer 261. The multiplexer 261 is conditioned by the second state of the multiplexer control signal to reproduce the interim symbol decoding results, as the final coding results which are its output signal. The second linear combiner 262 supplies postcoded symbol decoding results as its output signal to the third input port of the multiplexer 261. The multiplexer 261 is conditioned by the third state of the multiplexer control signal to reproduce the postcoded symbol decoding results, as the final coding results which are its output signal.

Running errors in the postcoded symbol decoding results from the postcoding comb filter 26 are curtailed by feeding back the ideal symbol decoding results supplied from memory within the controller 28 during times data sync detection circuitry 18 recovers data field synchronization information F and data segment synchronization information S. This is an important aspect of the invention, which will be described in greater detail further on in this specification.

The output signal from the multiplexer 261 in the postcoding comb filter 26 comprises the final symbol decoding results in 3-parallel-bit groups, assembled by a data assembler 30 for application to a data interleaver 32. The data interleaver 32 commutates the assembled data into parallel data streams for application to trellis decoder circuitry 34. Trellis decoder circuitry 34 conventionally uses twelve trellis decoders. The trellis decoding results are supplied from the trellis decoder circuitry 34 to data de-interleaver circuitry 36 for de-commutation. Byte parsing circuitry 38 converts the data interleaver 36 output signal into bytes of Reed-Solomon error-correction coding for application to Reed-Solomon decoder circuitry 40, which performs Reed-Solomon decoding to generate an error-corrected byte stream supplied to a data de-randomizer 42. The data de-randomizer 42 supplies reproduced data to the remainder of the receiver (not shown). The remainder of a complete DTV receiver will include a packet sorter, an audio decoder, an MPEG-2 decoder and so forth. The remainder of a DTV receiver incorporated in a digital tape recorder/reproducer will include circuitry for converting the data to a form for recording.

An NTSC co-channel interference detector 44 supplies the controller 28 with an indication of whether NTSC co-channel interference is of sufficient strength as to cause uncorrectable error in the data-slicing performed by the data-slicer 22. If detector 44 indicates the NTSC co-channel interference is not of such strength, the controller 28 will supply the second state of multiplexer control signal to the multiplexer 261 at times other than those times when data field synchronization information F and data segment synchronization information S are recovered by the data sync detection circuitry 18. This conditions the multiplexer 261 to reproduce as its output signal the interim symbol decoding results supplied from the odd-level data-slicer 22. If detector 44 indicates the NTSC co-channel interference is of sufficient strength to cause uncorrectable error in the data-slicing performed by the data-slicer 22, the controller 28 will supply the third state of multiplexer control signal to the multiplexer 261 at times other than those times when data field synchronization information F and data segment synchronization information S are recovered by the data sync detection circuitry 18. This conditions the multiplexer 261 to reproduce as its output signal the postcoded symbol decoding results provided as second linear combining results from the second linear combiner 262.

Figure 2:
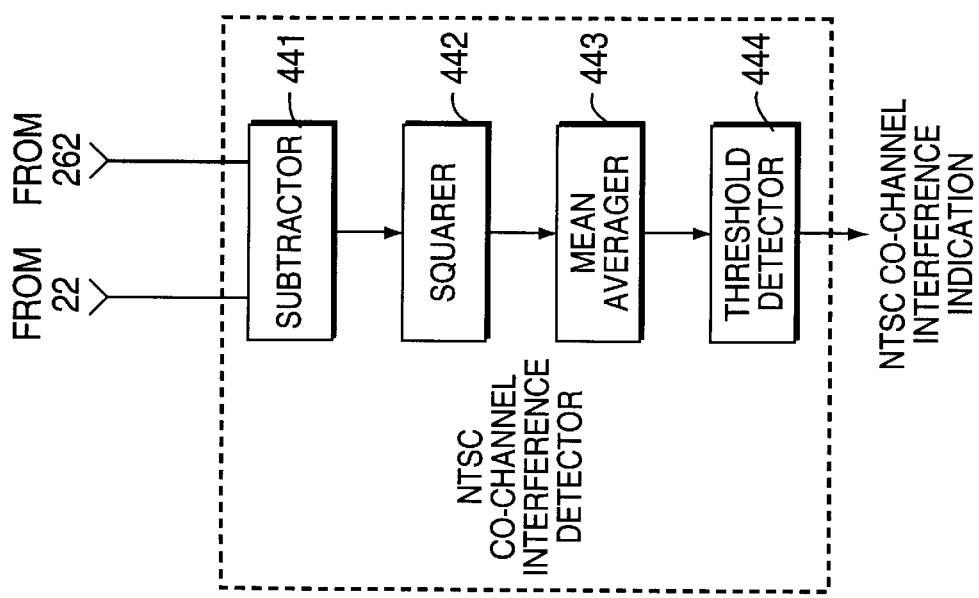
FIG. 2 is a block schematic diagram of an NTSC co-channel interference detector for use in the FIG. 1 digital television signal receiver.

FIG. 2 shows a form the NTSC co-channel interference detector 44 can take, which form is believed to be novel in the art. A subtractor 441 differentially combines the interim symbol decoding results supplied from the odd-level data-slicer 22 and the postcoded symbol decoding results provided as second linear combining results from the second linear combiner 262. If the amount of NTSC co-channel interference is negligible, and if the random noise in the baseband I-channel signal is negligible, these interim and postcoded symbol decoding results should be similar, so the difference output signal from the subtractor 441 should be low. If the amount of NTSC co-channel interference is appreciable, however, the difference output signal from the subtractor 441 will not be generally low, but rather will often be high.

A measure of the energy in the difference output signal from the subtractor 441 is developed by squaring the difference output signal with a squarer 442 and determining the mean average of the squarer response over a prescribed short time interval with a mean averaging circuit 443. The squarer 442 can be implemented using read-only memory (ROM).

The mean averaging circuit 443 can be implemented using a delay line memory for storing several successive digital samples and an adder for summing the digital samples currently stored in the delay line memory. The short-term mean average of the energy in the difference output signal from the subtractor 441, as determined by the mean averaging circuit 443, is supplied to a digital comparator connected to provide a threshold detector 444. The threshold in the threshold detector 444 is sufficiently high not to be exceeded the short-term mean-average of differences in the random noise accompanying the interim symbol decoding results and the postcoded symbol decoding results applied to the subtractor 441. The threshold is exceeded if the NTSC co-channel interference is of sufficient strength as to cause uncorrectable error in the data-slicing performed by the data-slicer 22. The threshold detector 444 supplies the controller 28 indication of whether or not the threshold is exceeded.

Figure 3:
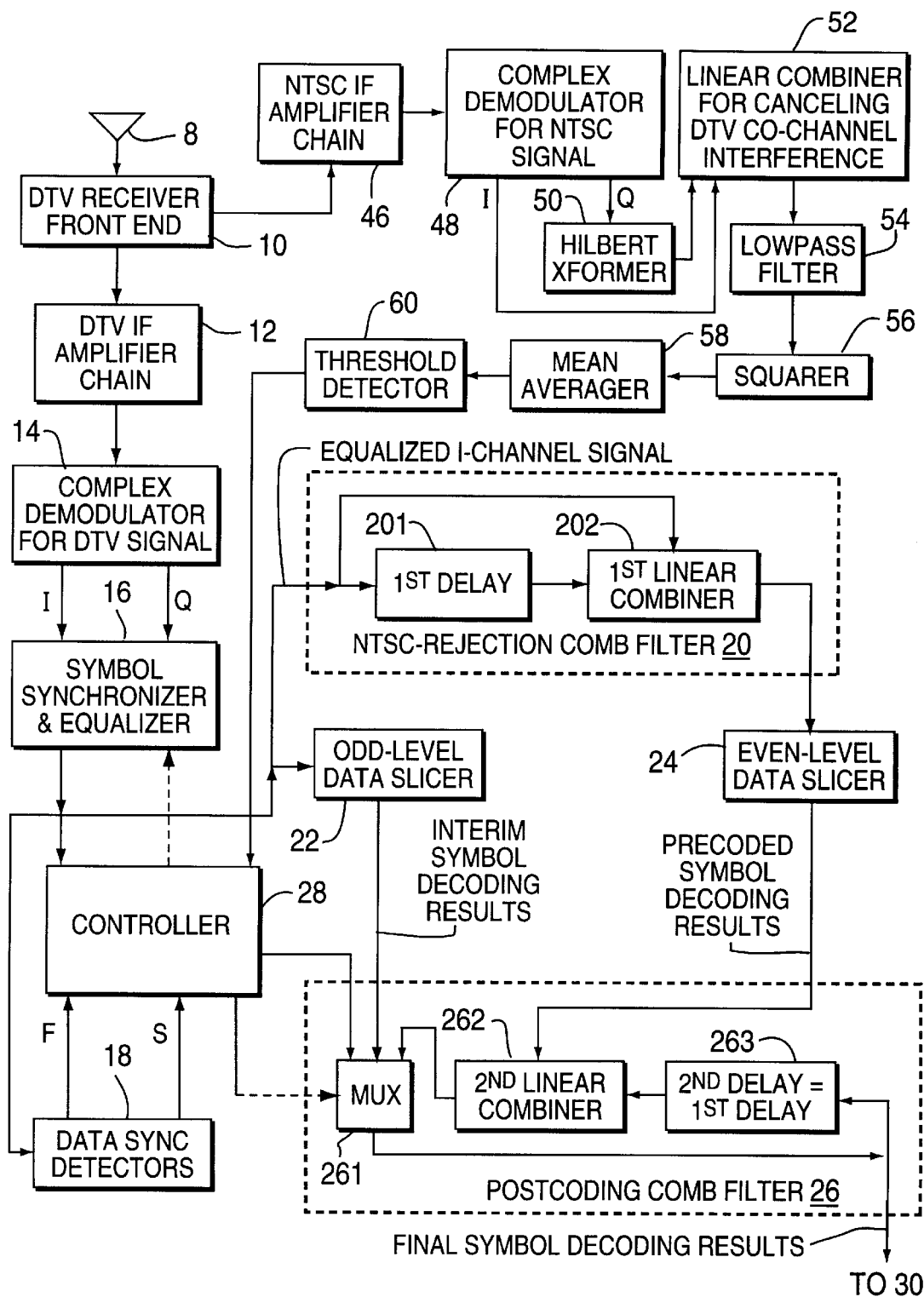
FIG. 3 is a block schematic diagram of a portion of digital television signal receiver using an NTSC-rejection comb filter before symbol decoding and a postcoding comb filter after symbol decoding, in accordance with the invention, and using a co-channel interference detector of a type described by the inventor in U.S. patent application Ser. No. 08/821,945 filed 21 Mar., 1997.

FIG. 3 shows a digital television receiver differing from that of FIG. 1 in that the circuitry for determining whether or not NTSC co-channel interference is of sufficient strength as to cause uncorrectable error in the data-slicing performed by the data-slicer 22 is of the type described by the inventor in U.S. patent application Ser. No. 08/821,945 filed 21 Mar. 1997 and entitled "USING VIDEO SIGNALS FROM AUXILIARY ANALOG TV RECEIVERS FOR DETECTING NTSC INTERFERENCE IN DIGITAL TV RECEIVERS". The DTV signal, as converted to IF by the "front end" electronics 10, is supplied to an IF amplifier chain 46 for NTSC signals. The IF amplifier chain 46 for NTSC signals differs from the IF amplifier chain used in conventional NTSC signal receivers. Insofar as midband gain characteristics are concerned, amplifier stages in the IF amplifier chain 46 for NTSC signals correspond to the amplifier stages in the IF amplifier chain 12 for DTV signals, having substantially linear gain and having the same automatic gain control as the corresponding amplifier stages in the IF amplifier chain 12. The vestigial sideband of the NTSC signal is not suppressed in the IF amplifier chain 46. The portion of the full sideband of the NTSC signal that is single-sideband in character is preferably suppressed in the IF amplifier chain 46 to reduce the energy of co-channel DTV signal. The reduces the dynamic range of IF amplifier chain 46 response, facilitating additional amplification of video carrier for locking the phase of a local video carrier oscillator used in the complex demodulator 48. The filtering procedures to establish the bandwidth of the IF amplifier chain 46 can be carried out by SAW filtering in a UHF IF amplifier if plural-conversion receiver circuitry is used. The amplified IF response of the IF amplifier chain 46 is supplied to a complex demodulator 48 for NTSC video signal, either directly or after some further amplification. The complex demodulator 48 supplies an in-phase I-channel response composed of samples of NTSC signal and the real component of accompanying DTV artifacts. The complex demodulator 48 also supplies a quadrature-phase Q-channel response composed of samples of the imaginary component of accompanying DTV artifacts, which samples are applied to a Hilbert transformation filter 50. The Hilbert transformation filter 50 response is supplied to a linear combiner 52. The linear combiner 52 combines the Hilbert transformation filter 50 response with suitably delayed in-phase I-channel response, to recover samples of NTSC signal substantially free from accompanying DTV artifacts. The linear combiner 52 is an adder or a subtractor depending on relative video carrier phasing during the synchronous demodulation procedures used in the complex demodulator 48 to generate the I-channel and Q-channel responses.

The NTSC signal substantially free from accompanying DTV artifacts supplied from the linear combiner 52 is applied to a lowpass filter 54 with a cut-off frequency of 750 kHz or less. An estimate of luminance signal energy in the co-channel interfering NTSC signal is generated by squaring the lowpass filter 54 response with a squarer 56 and determining the mean average of the squarer response over a prescribed short time interval with a mean averaging circuit 58. This estimate is supplied to a threshold detector 58. The threshold in the threshold detector 58 is exceeded if the NTSC co-channel interference is of sufficient strength as to cause uncorrectable error in the data-slicing performed by the data-slicer 22. The threshold detector 58 supplies the controller 28 indication of whether or not the threshold is exceeded.

Figure 4:
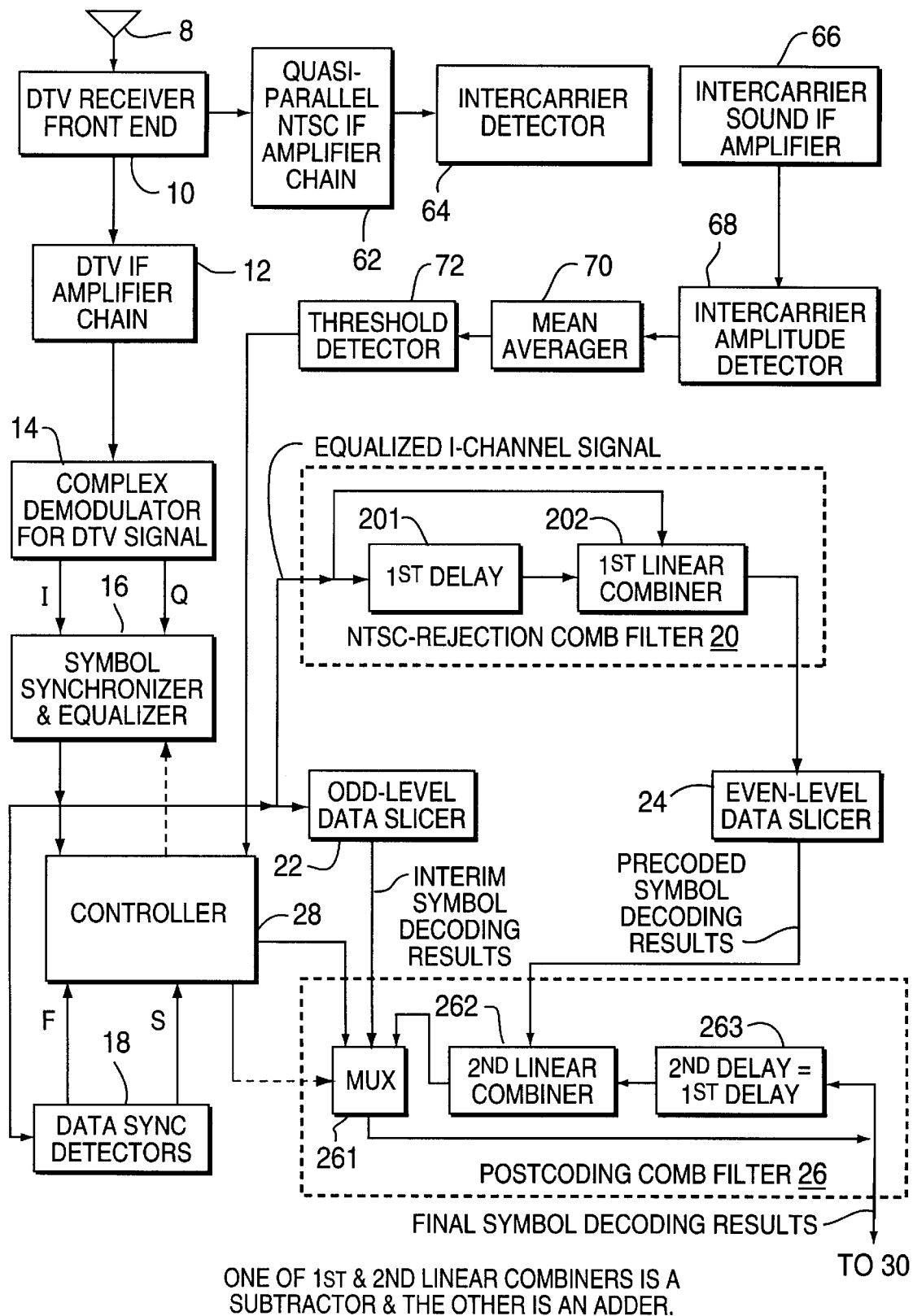
FIG. 4 is a block schematic diagram of a portion of a digital television signal receiver using an NTSC-rejection comb filter before symbol decoding and a postcoding comb filter after symbol decoding, in accordance with the invention, and using a co-channel interference detector of a type described by the inventor in U.S. patent application Ser. No. 08/821,944 filed 21 Mar., 1997.

FIG. 4 shows a digital television receiver differing from the FIG. 1 and FIG. 3 receivers in that the circuitry for determining whether or not NTSC co-channel interference is of sufficient strength as to cause uncorrectable error in the data-slicing performed by the data-slicer 22 is of the type described by the inventor in U.S. patent application Ser. No. 08/821,944 filed 21 Mar., 1997 and entitled "USING INTERCARRIER SIGNALS FOR DETECTING NTSC INTERFERENCE IN DIGITAL TV RECEIVERS". The DTV signal, as converted to IF by the "front end" electronics 10, is supplied to an IF amplifier chain 62 of quasi-parallel type for NTSC sound signals. The amplifier stages in the IF amplifier chain 62 for NTSC sound signals correspond to similar amplifier stages in the IF amplifier chain 12 for DTV signals, having substantially linear gain and having the same automatic gain control as the corresponding amplifier stages in the IF amplifier chain 12. The frequency selectivity of the IF amplifier chain 62 is such as to emphasize response within ±250 kHz of NTSC audio carrier and within ±250 kHz or so of NTSC video carrier. The filtering procedures to establish the frequency selectivity of the IF amplifier chain 62 can be carried out by SAW filtering in a UHF IF amplifier if plural-conversion receiver circuitry is used. The response of the IF amplifier chain 62 is supplied to an intercarrier detector 64 which uses the modulated NTSC video carrier as an exalted carrier for heterodyning the NTSC audio carrier to generate intercarrier sound intermediate-frequency signal with a 4.5 MHz carrier frequency. This intercarrier sound IF signal is amplified by an intercarrier-sound intermediate-frequency amplifier 66, which 4.5 MHz IF amplifier 66 supplies amplified intercarrier sound IF signal to an intercarrier amplitude detector 68. The response of the amplitude detector 68 is averaged over a prescribed short time interval with a mean averaging circuit 70, and the resulting mean average is supplied to a threshold detector 72. The threshold in the threshold detector 72 is exceeded if the NTSC co-channel interference is of sufficient strength as to cause uncorrectable error in the data-slicing performed by the data-slicer 22. The threshold detector 72 supplies the controller 28 indication of whether or not the threshold is exceeded.

Figure 5:
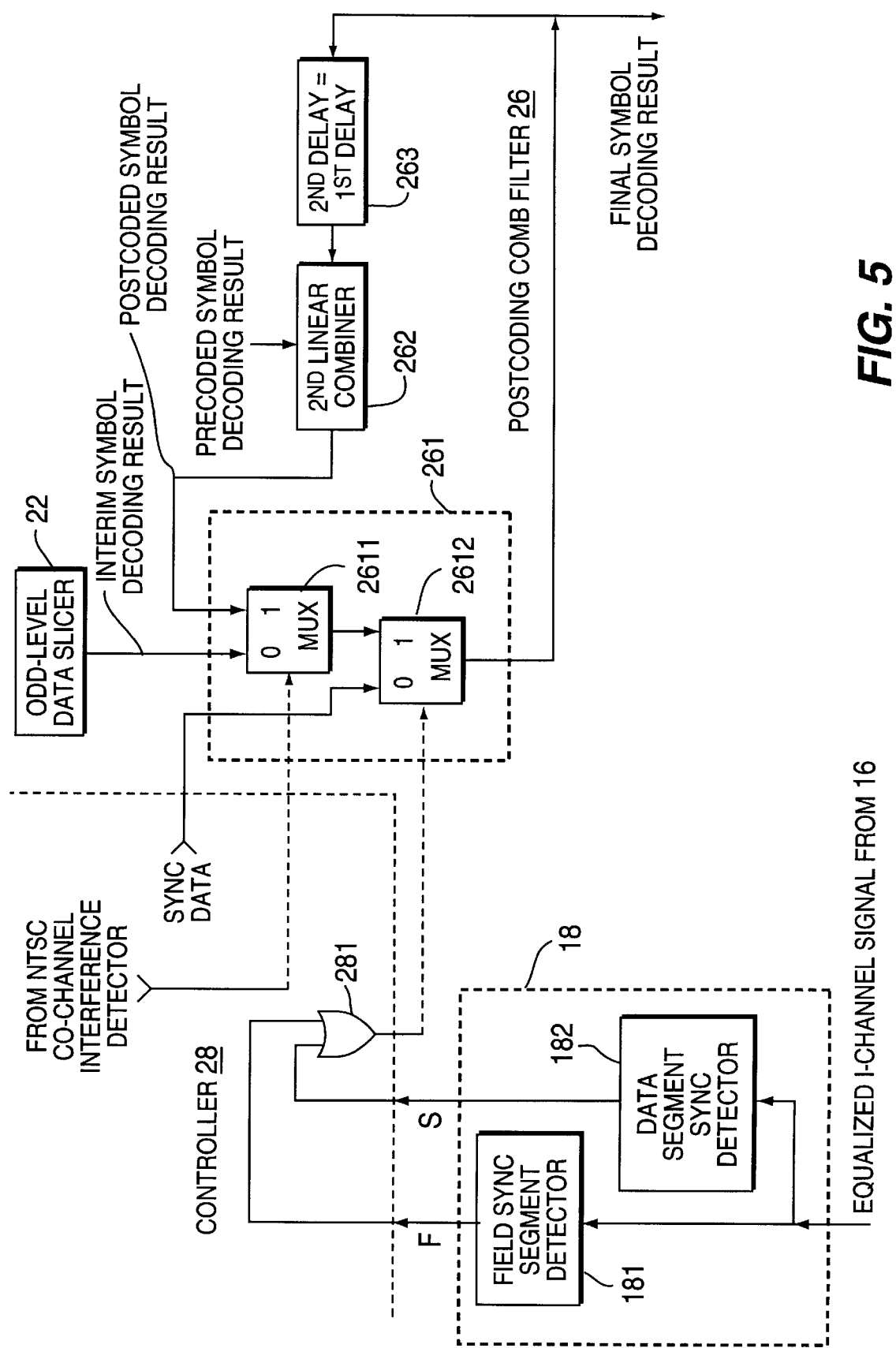
FIG. 5 is a block schematic diagram showing details of a portion of the FIG. 1, FIG. 3 or FIG. 4 digital television signal receiver concerning the selection of final symbol decoding results, selected from prescribed symbol decoding results during data synchronization intervals and selected at other times from data-slicer response to the received baseband symbol codes or from postcoded data-slicer response to comb filter response to the received baseband symbol codes, depending on whether or not the received baseband symbol codes are substantially free of NTSC co-channel interference.

FIG. 5 shows a preferred way in which the multiplexer 261 in the postcoding comb filter 26 is implemented. The 3-input multiplexer 261 is shown as comprising two 2-input multiplexers 2611 and 2612. The controller 28 applies the output signal from the NTSC co-channel interference detector (e. g., 44) as control signal to the 2-input multiplexer 2611.

If the NTSC co-channel interference is of sufficient strength to cause uncorrectable error in the data-slicing performed by the data-slicer 22, the resulting ONE output signal from the NTSC co-channel interference detector conditions the multiplexer 2611 to reproduce, for application to the second input port of the multiplexer 2612, the post-coded symbol decoding results the second linear combiner 262 supplies to the first input port of the multiplexer 2611.

If the NTSC co-channel interference is of insufficient strength to cause uncorrectable error in the data-slicing performed by the data-slicer 22, the resulting ZERO output signal from the NTSC co-channel interference detector conditions the multiplexer 2611 to reproduce the interim symbol decoding results the data-slicer 22 supplies to the second input port of the multiplexer 2611. These reproduced interim symbol decoding results are applied to the second input port of the multiplexer 2612.

Figure 6:
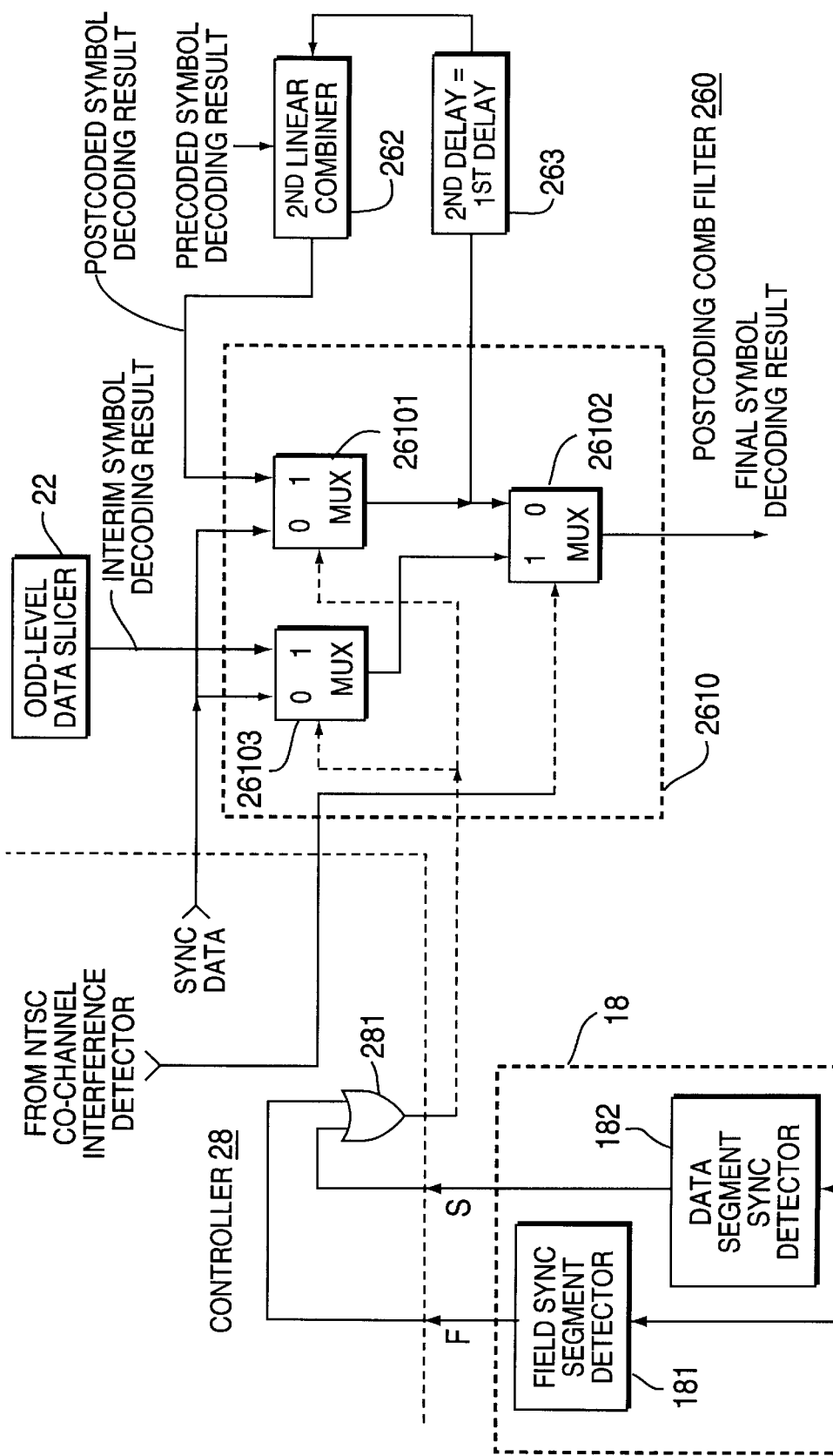
FIG. 6 is a block schematic diagram of circuitry alternative to that of FIG. 5.
Figure 7:
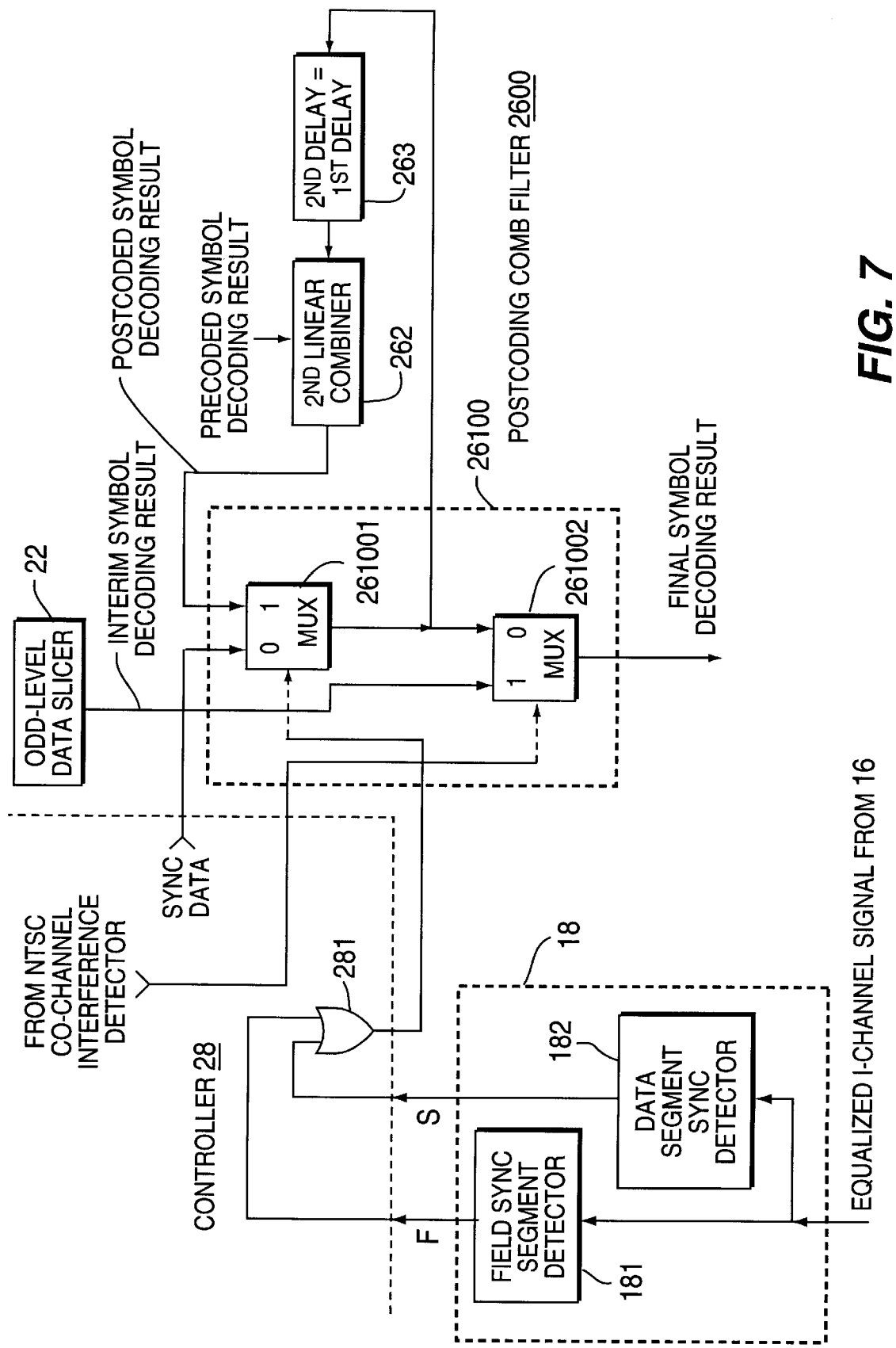
FIG. 7 is a block schematic diagram of other circuitry alternative to that of FIG. 5.

FIGS. 5, 6 and 7 each show an OR gate 281 being included in the controller 28. The OR gate 281 supplies a response that is a ONE, when the field segment sync detector 181 supplies a ONE thereto in response to the occurrence of a field sync segment being detected, and when the data segment sync detector 182 supplies a ONE thereto in response to the occurrence of a data sync code being detected. At all other times the OR gate 281 supplies a response that is a ZERO.

In FIG. 5 the OR gate 281 response is applied as control signal to the multiplexer 2612. The OR gate 281 response being ZERO conditions the multiplexer 2612 to reproduce, as final symbol decoding result for application to the data assembler 30, the output signal of the multiplexer 2611 supplied to the second input port of the multiplexer 2612 as better estimate of symbol decoding result. The OR gate 281 response being ONE conditions the multiplexer 2612 to reproduce, as final symbol decoding result for application to the data assembler, ideal decoding results drawn from memory in the controller 28, as will be described in detail further on in this specification with reference to FIG. 8 of the drawing.

FIG. 6 shows an alternative construction 260 of the post coding comb filter 26. The 3-input multiplexer 261 comprising two 2-input multiplexers 2611 and 2612 is replaced by a 3-input multiplexer 2610 comprising three 2-input multiplexers 26101, 26102 and 26103.

FIG. 7 shows a modification 2600 of the post coding comb filter 26, in which the 3-input multiplexer 261 comprising two 2-input multiplexers 2611 and 2612 is replaced by a 3-input multiplexer 26100 comprising two 2-input multiplexers 261001 and 261002 receiving their respective control signals from the OR gate 281 and from the NTSC co-channel interference detector. The post coding comb filter 2600 provides somewhat different operating result than the post coding comb filters 26 and 260. The multiplexer 261001 replaces postcoded symbol decoding results with ideal symbol decoding results when the OR gate 281 response is ONE. When NTSC co-channel interference detector supplies a ONE indicative that NTSC co-channel interference is of sufficient strength to cause uncorrectable error in the data-slicing performed by the data-slicer 22, a multiplexer 261002 selects the resulting modified postcoded symbol decoding results as final symbol decoding results for application to the data assembler 30. When NTSC co-channel interference detector supplies a ZERO indicative that NTSC co-channel interference is of insufficient strength to cause uncorrectable error in the data-slicing performed by the data-slicer 22, the multiplexer 261002 selects the interim symbol decoding results from the data-slicer 22 as final symbol decoding results for application to the data assembler 30, without any replacement of those interim symbol decoding results by ideal symbol decoding results.

Figure 8:
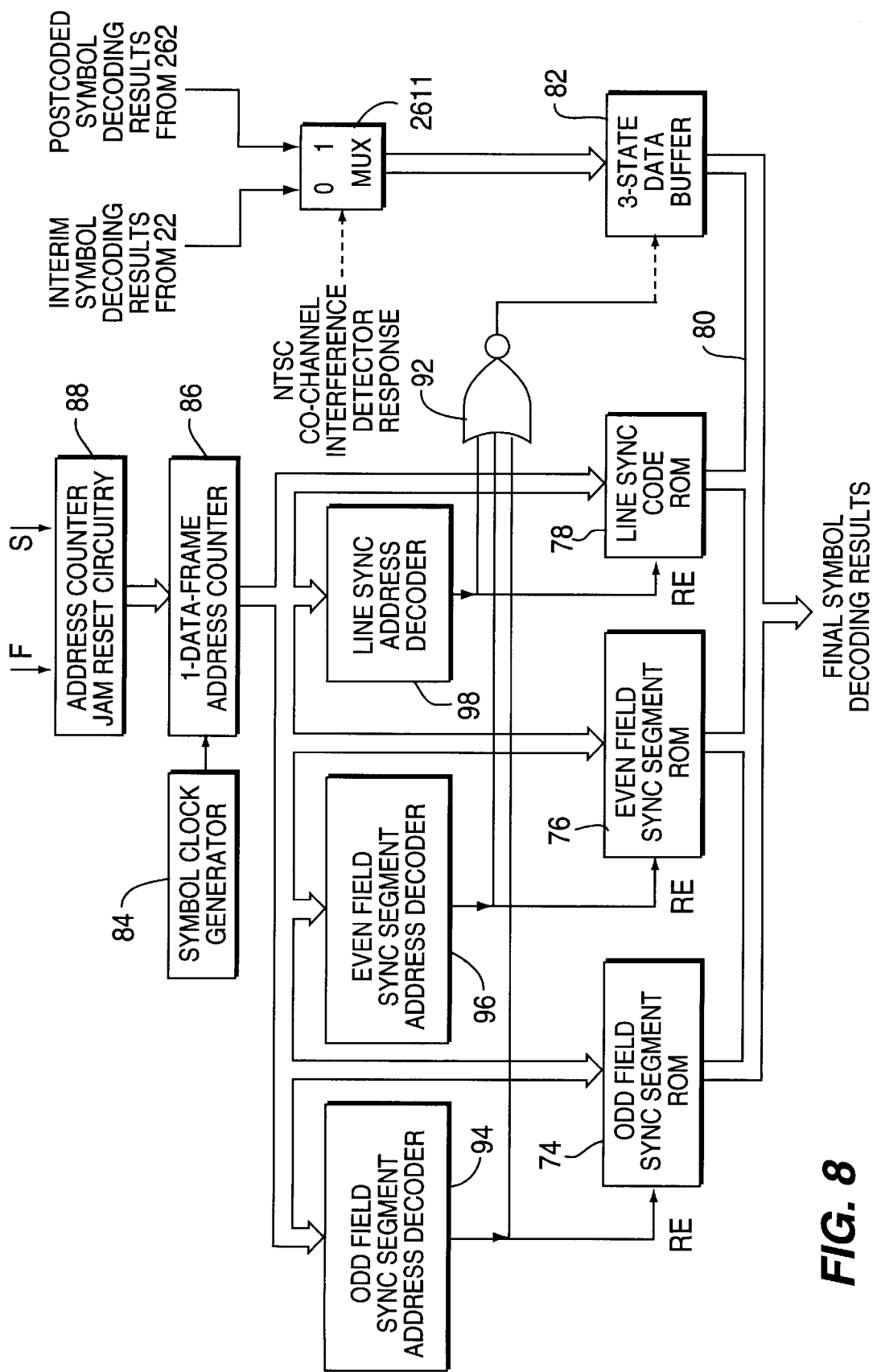
FIG. 8 is a block schematic diagram showing details of a portion of the FIG. 1, FIG. 3 or FIG. 4 digital television signal receiver for generating prescribed symbol decoding results during data synchronization intervals.

FIG. 8 shows the multiplexer 2612 of FIG. 5 in greater detail, together with the circuitry for generating the ideal symbol decoding results applied to the multiplexer 2612. The multiplexer 2612 comprises the output buffer registers of read-only memories (ROMs) 74, 76, 78 for selectively reading to a 3-bit-wide output bus 80 from the multiplexer 2612. The multiplexer 2612 further comprises a tri-state buffer 82 for selectively forwarding the 3-bit-wide output of the multiplexer 2611 to the output bus 80.

The circuitry for generating the ideal symbol decoding results applied to the multiplexer 2612 comprises the ROMs 74, 76, 78; a symbol clock generator 84; an address counter 86 for addressing the ROMs 74, 76, 78; jam reset circuitry 88 for resetting the counter 86; the address decoders 94, 96, 98 for generating read enable signals for the ROMs 74, 76, 78; and a NOR gate 92 for controlling the tri-state buffer 82. The address counter 86 counts input pulses received at symbol decoding rate from the symbol clock generator 84, thereby to generate successive addresses respectively descriptive of the symbols in one data frame. Suitable portions of these addresses are applied to the ROMs 74, 76, 78 as their input addresses. The jam reset circuitry 88 resets the counter 86 to appropriate counts responsive to data field synchronization information F and data segment synchronization information S recovered by the data sync detection circuitry 18 of FIG. 1, 3 or 4.

It is preferable to configure the counter 86 so a group of more significant bits counts the number of data segments per data frame and so a group of less significant bits counts the number of symbols per data segment. This simplifies the design of the jam reset circuitry 88; reduces the bit-widths of input signal to the address decoders 94, 96, 98; and facilitates the ROMs 74, 76, 78 being addressed by partial addresses from the counter 86, reducing the bit widths of ROM addressing.

The ROM 74 stores ideal symbol decoding results for an odd field sync segment and is selectively enabled for reading by receiving a ONE from the address decoder 94. The ROM 74 is addressed by the group of less significant bits of counter 86 output that counts the number of symbols per data segment group; and the address decoder 94 responds to the group of more significant bits that counts the number of data segments per data frame. The address decoder 94 generates a ONE when and only when the data segment portion of the address supplied by the address counter 86 corresponds to the address of an odd field sync segment.

The ROM 76 stores ideal symbol decoding results for an even field sync segment and is selectively enabled for reading by receiving a ONE from the address decoder 96. The ROM 76 is addressed by the group of less significant bits of counter 86 output that counts the number of symbols per data segment group; and the address decoder 96 responds to the group of more significant bits that counts the number of data segments per data frame. The address decoder 96 generates a ONE when and only when the data segment portion of the address supplied by the address counter 86 corresponds to the address of an even field sync segment.

The ROM 78 stores ideal symbol decoding results for the start code group at the beginning of each sync segment and is selectively enabled for reading by receiving a ONE from the address decoder 98. The ROM 78 responds to the two least significant bits of counter 86 output; and the address decoder 98 responds to the group of less significant bits of counter 86 output that counts the number of symbols per data segment group. The address decoder 98 generates a ONE when and only when the data symbol per data segment count portion of the address supplied by the address counter 86 corresponds to the partial address of a start code group.

The NOR gate 92 receives the responses of the address decoders 94, 96 and 98 at respective ones of its three input connections. When ideal symbol decoding results are available, one of the address decoders 94, 96 and 98 supplies a ONE as its output signal, conditioning the NOR gate 92 to supply a ZERO response to the tri-state data buffer 82. This conditions the tri-state data buffer 82 to exhibit a high source impedance to the data bus 80, so the signal forwarded from the multiplexer 2611 will not be asserted on the 3-bit-wide data bus 80 from the multiplexer 2612. During those portions of data segments for which ideal symbol decoding results are not predictable, none of the address decoders 94, 96 and 98 supplies a ONE as its output signal, conditioning the NOR gate 92 to supply a ONE response to the tri-state data buffer 82. This conditions the tri-state data buffer 82 to exhibit a low source impedance to the data bus 80, so the signal forwarded from the multiplexer 2611 will be asserted on the 3-bit-wide data bus 80 from the multiplexer 2612.

The FIG. 8 circuitry for generating ideal symbol decoding results applied to the multiplexer 2612 is readily adapted by one skilled in the art of digital circuit design for use in the configurations shown in FIGS. 6 and 7.

Figure 9:
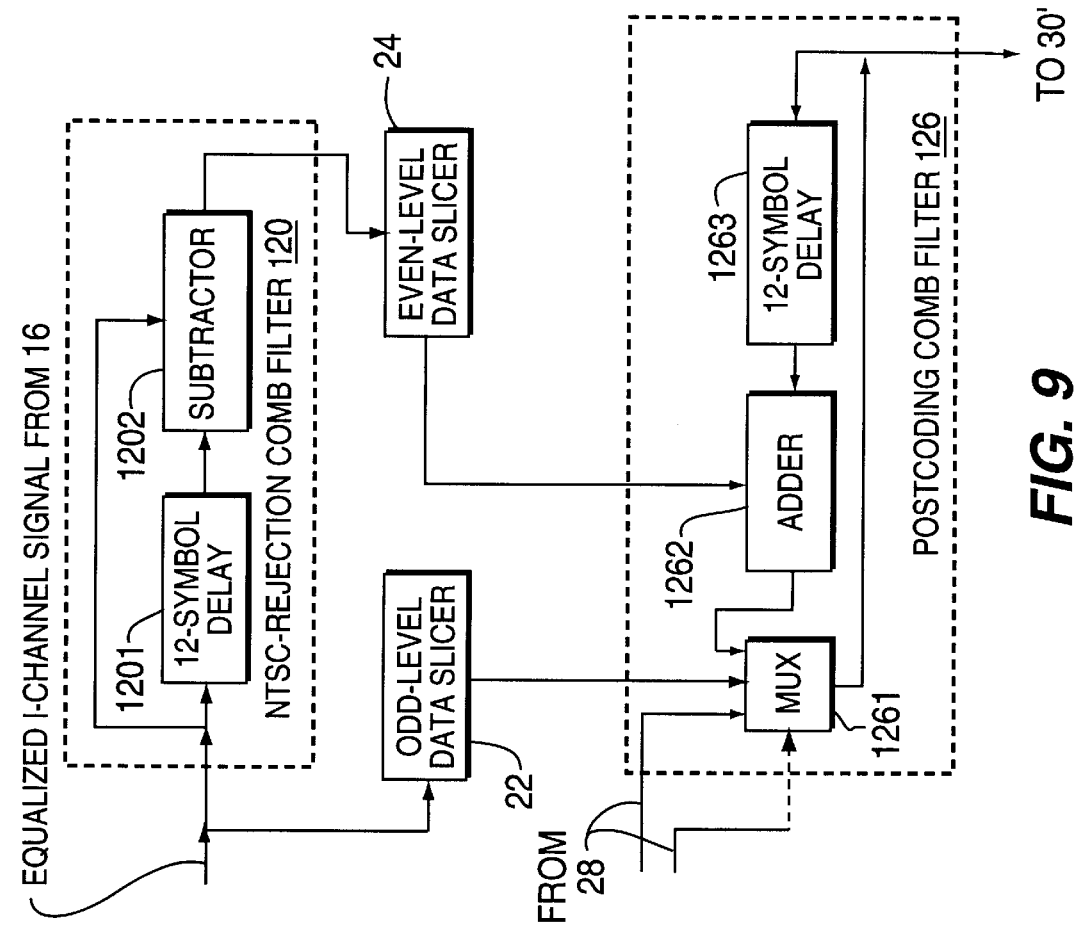
FIG. 9 is a block schematic diagram showing details of a portion of the FIG. 1, FIG. 3 or FIG. 4 digital television signal receiver when the NTSC-rejection comb filter employs a 12-symbol delay.

FIG. 9 is a block schematic diagram showing details of a portion of the FIG. 1, FIG. 3 or FIG. 4 digital television signal receiver using a species 120 of the NTSC-rejection comb filter 20 and a species 126 of the postcoding comb filter 26. A subtractor 1202 serves as the first linear combiner in the NTSC-rejection comb filter 120, and a modulo-8 adder 1262 serves as the second linear combiner in the postcoding comb filter 126. The NTSC-rejection comb filter 120 uses a first delay device 1201 exhibiting a delay of twelve symbol epochs, and the postcoding comb filter 126 uses a second delay device 1263 also exhibiting a delay of twelve symbol epochs. The 12-symbol delay exhibited by each of the delay devices 1201 and 1263 is close to one cycle delay of the artifact of the analog TV video carrier at 59.75 times the analog TV horizontal scan frequency $f_H$. The 12-symbol delay is close to five cycles of the artifact of the analog TV chrominance subcarrier at 287.25 times $f_H$. The 12-symbol delay is close to six cycles of the artifact of the analog TV sound carrier at 345.75 times $f_H$. This is the reason that the differentially combined response of the subtractor 1202 to the audio carrier, to the video carrier and to frequencies close to chrominance subcarrier differentially delayed by the first delay device 1201 tends to have reduced co-channel interference. However, in portions of a video signal in which edges cross a horizontal scan line, the amount of correlation in the analog TV video signal at such distances in the horizontal spatial direction is quite low.

A species 1261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The multiplexer 1261 is conditioned by its control signal being in its third state to feed back the modulo-8 sum results of the adder 1262, as delayed twelve symbol epochs by the delay device 1263, to the adder 1262 as a summand. This is a modular accumulation procedure in which a single error propagates as a running error, with error recurring every twelve symbol epochs. Running errors in the postcoded symbol decoding results from the postcoding comb filter 126 are curtailed by the multiplexer 1261 being placed into its first state for four symbol epochs at the beginning of each data segment, as well as during the entirety of each data segment containing field sync. When this control signal is in its first state, the multiplexer 1261 reproduces as its output signal ideal symbol decoding results supplied from memory in the controller 28. The introduction of ideal symbol decoding results into the multiplexer 1261 output signal halts a running error. Since there are 4+69(12) symbols per data segment, the ideal symbol decoding results slip back four symbol epochs in phase each data segment, so no running error can persist for longer than three data segments.

Figures 10, 11:
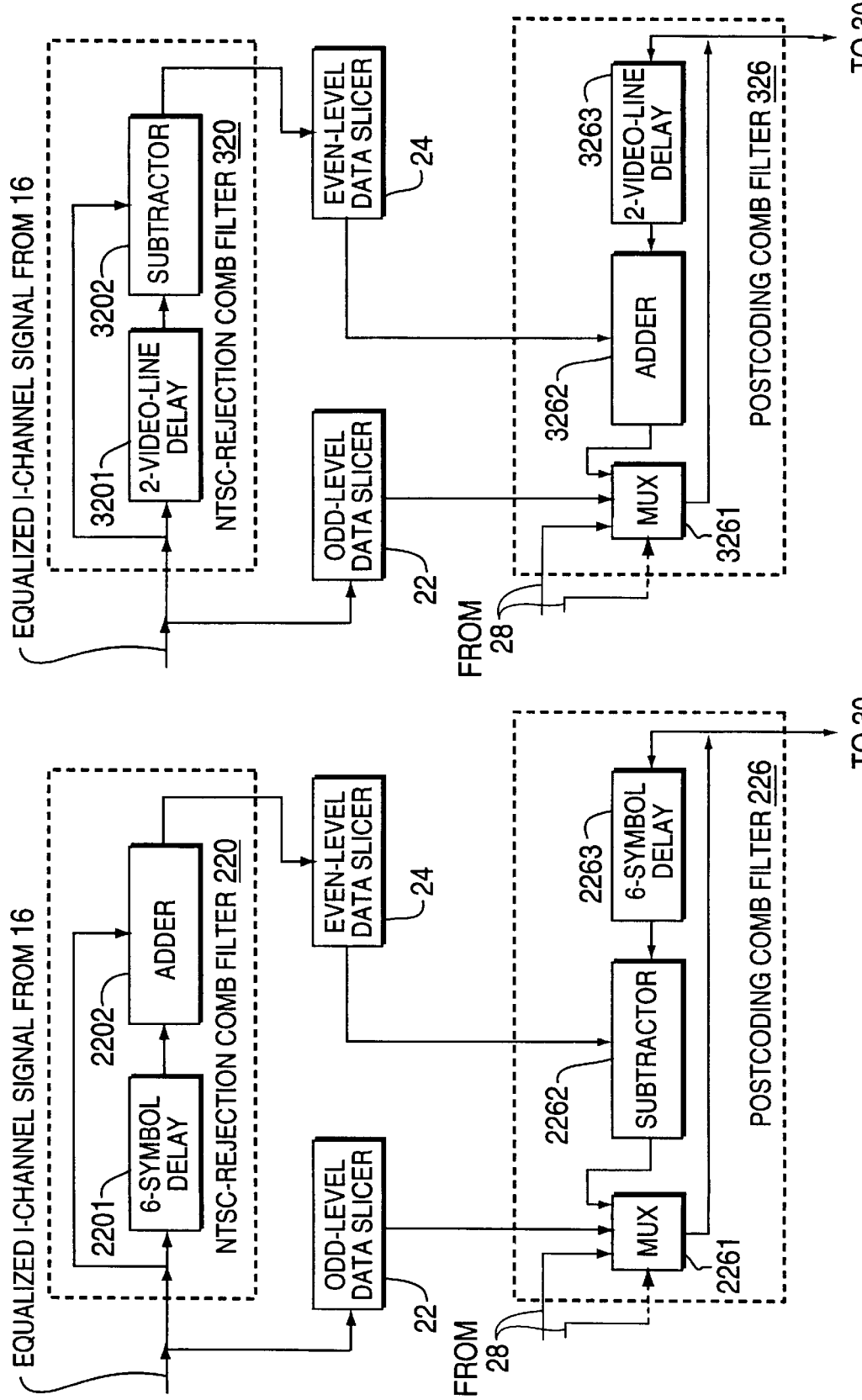
FIG. 10 is a block schematic diagram showing details of a portion of the FIG. 1, FIG. 3 or FIG. 4 digital television signal receiver when the NTSC-rejection comb filter employs a 6-symbol delay.
FIG. 11 is a block schematic diagram showing details of a portion of the FIG. 1, FIG. 3 or FIG. 4 digital television signal receiver when the NTSC-rejection comb filter employs a 2-video-line delay.

FIG. 10 is a block schematic diagram showing details of a portion of the FIG. 1, FIG. 3 or FIG. 4 digital television signal receiver using a species 220 of the NTSC-rejection comb filter 20 and a species 226 of the postcoding comb filter 26. The NTSC-rejection comb filter 220 uses a first delay device 2201 exhibiting a delay of six symbol epochs, and the postcoding comb filter 226 uses a second delay device 2263 also exhibiting a delay of six symbol epochs. The 6-symbol delay exhibited by each of the delay devices 2201 and 2263 is close to 0.5 cycle delay of the artifact of the analog TV video carrier at 59.75 times the analog TV horizontal scan frequency $f_H$, close to 2.5 cycles of the artifact of the analog TV chrominance subcarrier at 287.25 times $f_H$, and close to 3 cycles of any artifact of the analog TV audio carrier at 345.75 times $f_H$. An adder 2202 serves as the first linear combiner in the NTSC-rejection comb filter 220, and a modulo-8 subtractor 2262 serves as the second linear combiner in the postcoding comb filter 226. Since the delay exhibited by the delay devices 2201 and 2263 is shorter than the delay exhibited by the delay devices 1201 and 1263, although nulls near frequencies converted from analog TV carrier frequencies are narrower band, there is more likely to be good anti-correlation in the signals additively combined by the adder 2202 than there is likely to be good correlation in the signals differentially combined by the subtractor 1202. The suppression of the sound carrier is poorer in the NTSC-rejection comb filter 220 response than in the NTSC-rejection comb filter 120 response. However, if the sound carrier of a co-channel interfering analog TV signal has been suppressed by SAW filtering or a sound trap in the IF amplifier chain 12, the poor sound rejection of the comb filter 220 is not a problem. The responses to sync tips is reduced in duration using the NTSC-rejection comb filter 220 of FIG. 10 rather than the NTSC-rejection comb filter 120 of FIG. 9, so there is substantially reduced tendency to overwhelm error-correction in the trellis decoding and Reed-Solomon coding.

A species 2261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The multiplexer 2261 is conditioned by its control signal being in its third state to feed back the modulo-8 sum results of the adder 2262, as delayed six symbol epochs by the delay device 2263, to the adder 2262 as a summand. This is a modular accumulation procedure in which a single error propagates as a running error, with error recurring every six symbol epochs. Running errors in the postcoded symbol decoding results from the postcoding comb filter 226 are curtailed by the multiplexer 2261 being placed into its first state for four symbol epochs at the beginning of each data segment, as well as during the entirety of each data segment containing field sync. When this control signal is in its first state, the multiplexer 2261 reproduces as its output signal ideal symbol decoding results supplied from memory in the controller 28. The introduction of ideal symbol decoding results into the multiplexer 2261 output signal halts a running error. Since there are 4+138(6) symbols per data segment, the ideal symbol decoding results slip back four symbol epochs in phase each data segment, so no running error can persist for longer than two data segments. The likelihood of a protracted period of running error in the postcoding comb filter 226 is substantially less than in the postcoding comb filter 126, although the running error recurs more frequently and affects twice as many of the twelve interleaved trellis codes.

FIG. 11 is a block schematic diagram showing details of a portion of the FIG. 1, FIG. 3 or FIG. 4 digital television signal receiver using a species 320 of the NTSC-rejection comb filter 20 and a species 326 of the postcoding comb filter 26. The NTSC-rejection comb filter 320 uses a first delay device 3201 exhibiting a delay of 1368 symbol epochs, which delay is substantially equal to the epoch of two horizontal scan lines of an analog TV signal, and the postcoding comb filter 326 uses a second delay device 3263 also exhibiting such delay. The first linear combiner in the NTSC-rejection comb filter 320 is an adder 3202, and the second linear combiner in the postcoding comb filter 326 is a modulo-8 subtractor 3262.

A species 3261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV receiver preferably contains circuitry for detecting change between alternate scan lines in the NTSC co-channel interference, so that the controller 28 can withhold supplying the third state of the multiplexer 3261 control signal under such conditions.

The multiplexer 3261 is conditioned by its control signal being in its third state to feed back the modulo-8 sum results of the adder 3262, as delayed 1368 symbol epochs by the delay device 3263, to the adder 3262 as a summand. This is a modular accumulation procedure in which a single error propagates as a running error, with error recurring every 1368 symbol epochs. This symbol code span is longer than the span for a single block of the Reed-Solomon code, so a single running error is readily corrected during Reed-Solomon decoding. Running errors in the postcoded symbol decoding results from the postcoding comb filter 326 are curtailed by the multiplexer 3261 being placed into its first state during the entirety of each data segment containing field sync, as well as for four symbol epochs at the beginning of each data segment. When this control signal is in its first state, the multiplexer 3261 reproduces as its output signal ideal symbol decoding results supplied from memory in the controller 28. The introduction of ideal symbol decoding results into the multiplexer 3261 output signal halts a running error. The 16.67 millisecond duration of an NTSC video field exhibits phase slippage against the 24.19 millisecond duration of a DTV data field, so the DTV data segments containing field sync eventually scan the entire NTSC frame raster. The 525 lines in the NTSC frame raster each contain 684 symbol epochs, for a total of 359,100 symbol epochs. Since this is somewhat less than 432 times the 832 symbol epochs in a DTV data segment containing field sync, one can guess with reasonable confidence that running errors of duration longer than 432 data fields will be expunged by the multiplexer 3261 reproducing ideal symbol decoding results during DTV data segments containing field sync. There is also phase slippage between data segments, for the start code groups of which ideal symbol decoding results are available, and NTSC video scan lines. One can estimate 359,100 symbol epochs, which is 89,775 times the four symbol epochs in a code start group, are scanned during 89,775 consecutive data segments. Since there are 313 data segments per DTV data field, one can guess with reasonable confidence that running errors of duration longer than 287 data fields will be expunged by the multiplexer 3261 reproducing ideal symbol decoding results during the code start groups. The two sources of suppression of running errors are reasonably independent of each other, so running errors of duration longer than two hundred or so data fields are quite unlikely. Furthermore, if NTSC co-channel interference dips low at a time when the running error recurs, to condition the multiplexer 3261 for reproducing the response of the data-slicer 22 as its output signal, the error may be corrected earlier than would otherwise be the case.

The FIG. 11 NTSC-rejection comb filter 320 is quite good in suppressing demodulation artifacts generated in response to analog TV horizontal synchronizing pulses, as well as suppressing many of the demodulation artifacts generated in response to analog TV vertical synchronizing pulses and equalizing pulses. These artifacts are the co-channel interference with highest energy. Except where there is scan-line-to-scan-line change in the video content of the analog TV signal over the period of two scan lines, the NTSC-rejection comb filter 320 provides reasonably good suppression of that video content regardless of its color. The suppression of the FM audio carrier of the analog TV signal is reasonably good, in case it has not been suppressed by a tracking rejection filter in the symbol synchronization and equalization circuitry 16. Artifacts of most analog TV color bursts are suppressed in the NTSC-rejection comb filter 320 response, too. Furthermore, the filtering provided by the NTSC-rejection comb filter 320 is "orthogonal" to the NTSC-interference rejection built into the trellis decoding procedures.

Figure 12:
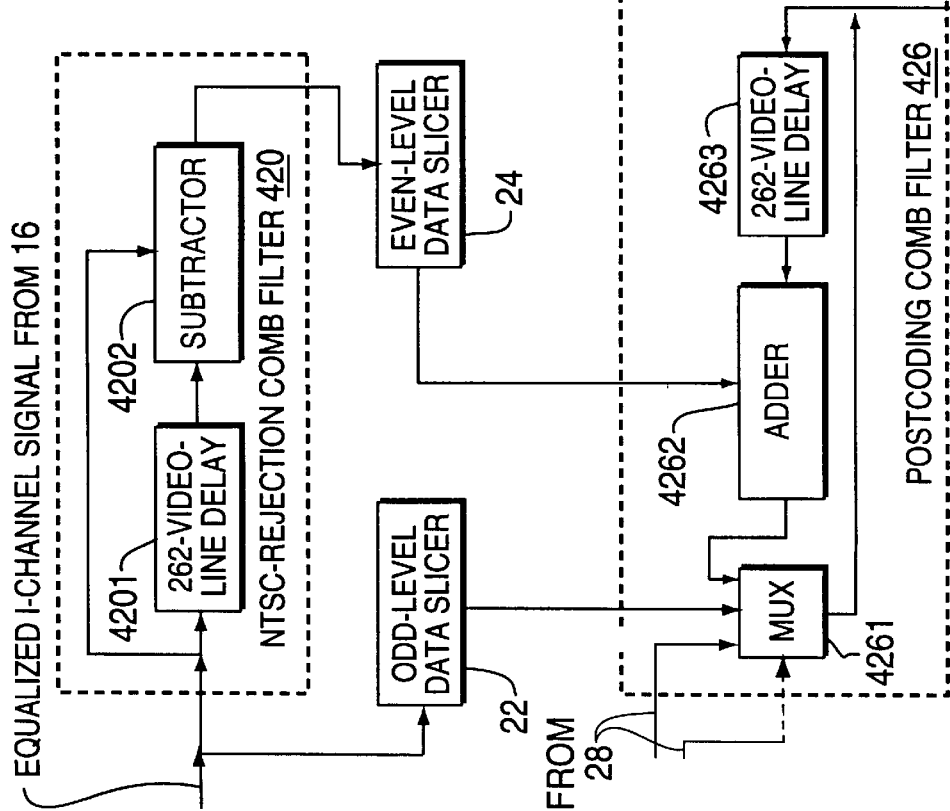
FIG. 12 is a block schematic diagram showing details of a portion of the FIG. 1, FIG. 3 or FIG. 4 digital television signal receiver when the NTSC-rejection comb filter employs a 262-video-line delay.

FIG. 12 is a block schematic diagram showing details of a portion of the FIG. 1, FIG. 3 or FIG. 4 digital television signal receiver using a species 420 of the NTSC-rejection comb filter 20 and a species 426 of the postcoding comb filter 26. The NTSC-rejection comb filter 420 uses a first delay device 4201 exhibiting a delay of 179,208 symbol epochs, which delay is substantially equal to the period of 262 horizontal scanning lines of an analog TV signal, and the postcoding comb filter 426 uses a second delay device 4261 also exhibiting such delay. An adder 4202 serves as the first linear combiner in the NTSC-rejection comb filter 420, and a modulo-8 subtractor 4262 serves as the second linear combiner in the postcoding comb filter 426.

A species 4261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV receiver preferably contains circuitry for detecting field-to-field change in the NTSC co-channel interference, so that the controller 28 can withhold supplying the third state of the multiplexer 4261 control signal under such conditions.

The multiplexer 4261 is conditioned by its control signal being in its third state to feed back the modulo-8 sum results of the adder 4262, as delayed 179,208 symbol epochs by the delay device 4263, to the adder 4262 as a summand. This is a modular accumulation procedure in which a single error propagates as a running error, with error recurring every 179,208 symbol epochs. This symbol code span is longer than the span for a single block of the Reed-Solomon code, so a single running error is readily corrected during Reed-Solomon decoding. Running errors in the postcoded symbol decoding results from the postcoding comb filter 426 are curtailed by the multiplexer 4261 being placed into its first state during the entirety of each data segment containing field sync, as well as for four symbol epochs at the beginning of each data segment. When this control signal is in its first state, the multiplexer 4261 reproduces as its output signal ideal symbol decoding results supplied from memory in the controller 28. The introduction of ideal symbol decoding results into the multiplexer 4261 output signal halts a running error. The maximum number of data fields required to expunge running error in the multiplexer 4261 output signal is presumably substantially the same as required to expunge running error in the multiplexer 3261 output signal. However, the number of times the error recurs in that period is lower by a factor of 131.

Figure 13:
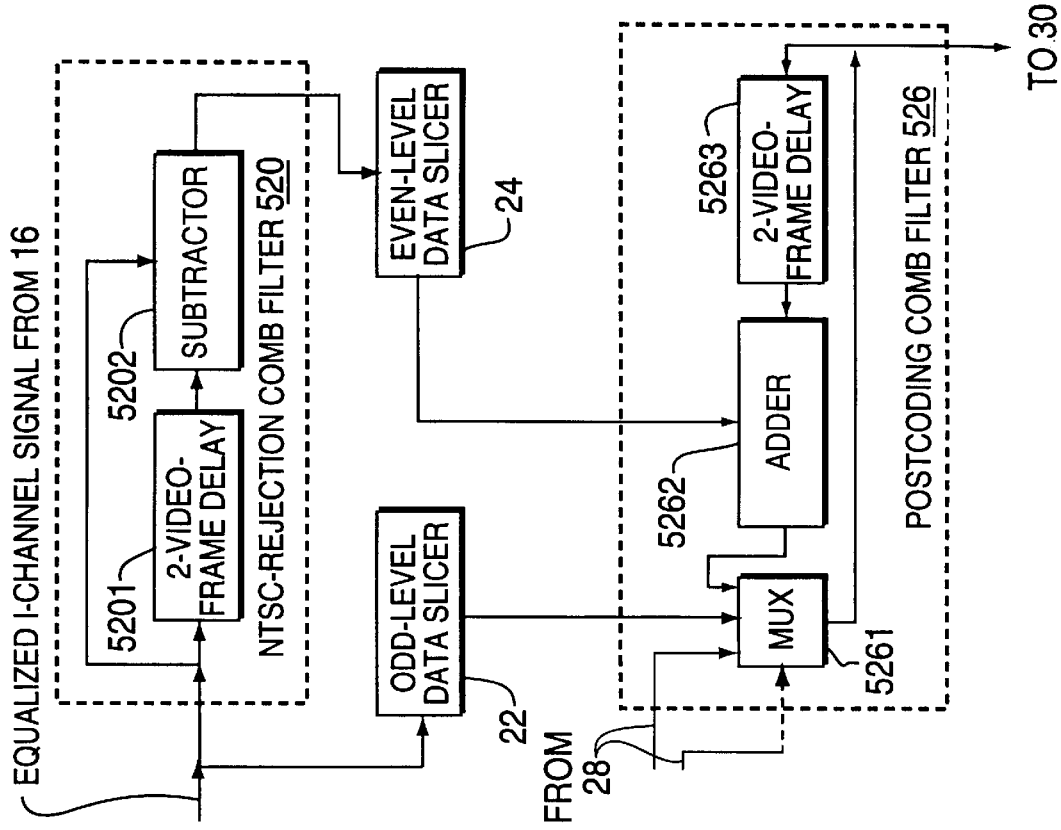
FIG. 13 is a block schematic diagram showing details of a portion of the FIG. 1, FIG. 3 or FIG. 4 digital television signal receiver when the NTSC-rejection comb filter employs a 2-video-frame delay.

The FIG. 12 NTSC-rejection comb filter 420 suppresses most demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 420 suppresses artifacts arising from the video content of the analog TV signal that does not change from field to field or line-to-line, getting rid of stationary patterns irrespective of their horizontal spatial frequency or color. Artifacts of most analog TV color bursts are suppressed in the NTSC-rejection comb filter 420 response, too FIG. 13 is a block schematic diagram showing details of a portion of the FIG. 1, FIG. 3 or FIG. 4 digital television signal receiver using a species 520 of the NTSC-rejection comb filter 20 and a species 526 of the postcoding comb filter 26. The NTSC-rejection comb filter 520 uses a first delay device 5201 exhibiting a delay of 718,200 symbol epochs, which delay is substantially equal to the period of two frames of an analog TV signal, and the postcoding comb filter 526 uses a second delay device 5261 also exhibiting such delay. A subtractor 5202 serves as the first linear combiner in the NTSC-rejection comb filter 520, and a modulo-8 adder 5262 serves as the second linear combiner in the postcoding comb filter 526.

A species 5261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV receiver preferably contains circuitry for detecting change between alternate frames in the NTSC co-channel interference, so that the controller 28 can withhold supplying the third state of the multiplexer 5261 control signal under such conditions.

The multiplexer 5261 is conditioned by its control signal being in its third state to feed back the modulo-8 sum results of the adder 5262, as delayed 718,200 symbol epochs by the delay device 5263, to the adder 5262 as a summand. This is a modular accumulation procedure in which a single error propagates as a running error, with error recurring every 718,200 symbol epochs. This symbol code span is longer than the span for a single block of the Reed-Solomon code, so a single running error is readily corrected during Reed-Solomon decoding. Running errors in the postcoded symbol decoding results from the postcoding comb filter 526 are curtailed by the multiplexer 5261 being placed into its first state during the entirety of each data segment containing field sync, as well as for four symbol epochs at the beginning of each data segment. When this control signal is in its first state, the multiplexer 5261 reproduces as its output signal ideal symbol decoding results supplied from memory in the controller 28. The introduction of ideal symbol decoding results into the multiplexer 5261 output signal halts a running error. The maximum number of data fields required to expunge running error in the multiplexer 5261 output signal is presumably substantially the same as required to expunge running error in the multiplexer 3261 output signal. However, the number of times the error recurs in that period is lower by a factor of 525.

The FIG. 13 NTSC-rejection comb filter 520 suppresses all demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 520 suppresses artifacts arising from the video content of the analog TV signal that does not change over two frames, getting rid of such very stationary patterns irrespective of their spatial frequency or color. Artifacts of all analog TV color bursts are suppressed in the NTSC-rejection comb filter 520 response, too.

One skilled in the art of television system design will discern other properties of correlation and anti-correlation in analog TV signals that can be exploited in the design of NTSC-rejection filters of still other types than those shown in FIGS. 9–13. The use of NTSC-rejection filters that cascade two NTSC-rejection filters of the types already disclosed increases the 2N levels of the baseband signals to (8N–1) data levels. Such filters may be required to overcome particularly bad co-channel interference problems despite their shortcoming of reducing signal-to-noise for random noise interference with symbol decoding.

FIG. 14 shows a modification of a digital television signal receiver as thusfar described, constructed in accordance with a further aspect of the invention so as to operate in parallel a plurality of symbol decoders using respective even-level data-slicers, each preceded by a different type of NTSC-rejection comb filter and each succeeded by a respective postcoding comb filter to compensate for the precoding introduced by the preceding NTSC-rejection comb filter. An even-level data-slicer A24 converts the response of an NTSC-rejection filter A20 of a first type to first precoded symbol decoding results for application to a postcoding comb filter A26 of a first type. An even-level data-slicer B24 converts the response of an NTSC-rejection filter B20 of a second type to second precoded symbol decoding results for application to a postcoding comb filter B26 of a second type. An even-level data-slicer C24 converts the response of an NTSC-rejection filter C20 of a third type to third precoded symbol decoding results for application to a postcoding comb filter C26 of a third type. The odd-level data-slicer 22 supplies interim symbol decoding results to the postcoding comb filters A26, B26 and C26. The prefixes A, B and C in the identification numbers for the elements of FIG. 14 are different integers which will correspond to respective ones of the integers 1, 2, 3, 4 and 5 when receiver portions as shown in ones of FIGS. 9–13 are employed.

Symbol decoding selection circuitry 90 in FIG. 14 formulates a best estimate of correct symbol decoding for application to the trellis decoding circuitry 34, selecting from the interim symbol decoding results received from the data-slicer 22 and the various postcoded symbol coding results received from postcoding comb filters A26, B26 and C26. The best estimate of symbol decoding results are used to correct the summation procedures in the postcoding comb filters A26, B26 and C26.

FIG. 15, comprising FIGS. 15A and 15B, illustrates in greater detail a currently preferred way of implementing the symbol decoding selection circuitry 90. FIG. 15A shows details of circuitry for generating prescribed symbol decoding results for application, during data synchronization intervals, to the 3-bit-wide output data bus 800 of the symbol decoding selection circuitry 90. The 15A circuitry operates similarly to circuitry described above with reference to FIG. 8.

FIG. 15B illustrates in greater detail circuitry within the symbol decoding selection circuitry 90 for selecting among the interim symbol decoding results and the various postcoded symbol decoding results, for generating final symbol decoding results during time periods between data synchronization intervals. The efficacies of the NTSC-rejection filters A20, B20 and C20 in removing NTSC co-channel interference from DTV signal are determined by observing how well related NTSC-rejection filters A100, B100 and C100 reduce the energy of NTSC co-channel interference translated to baseband and separated from DTV signal artifacts. Separation of NTSC co-channel interference from DTV signal proceeds as previously described with reference to FIG. 3. The lowpass filter 54 response to baseband video that has been synchronously detected from the NTSC co-channel interference is supplied as input signal to NTSC-rejection filters A100, B100 and C100. The NTSC-rejection filter A100 differs from the NTSC-rejection filter A20 of first type insofar as the type of linear combiner that is used, the linear combiner in one of the filters A20 and A100 being an adder and the linear combiner in the other of the filters A20 and A100 being a subtractor. This is because the filter A100 is supplied baseband video, but the artifact of NTSC video carrier in the DTV signal supplied to the filter A20 is not at baseband for video carrier. For similar reasons, the NTSC-rejection filter B100 differs from the NTSC-rejection filter B20 of second type insofar as the type of linear combiner that is used, and the NTSC-rejection filter C100 differs from the NTSC-rejection filter C20 of third type insofar as the type of linear combiner that is used. The responses of the NTSC-rejection filters A100, B100 and C100 are squared by squarers A102, B102 and C102, respectively, for determining the energies of these responses. The response of the lowpass filter 54 is squared by a squarer 104 for determining its energy.

FIG. 15B modifies the FIG. 8 circuitry to replace the multiplexer 2611 and the tri-state data buffer 82 with four tri-state data buffers 082, A82, B82 and C82. The tri-state data buffer 082 is used for selectively asserting the interim symbol decoding results from the data-slicer 22 onto the 3-bit-wide output data bus 800 of the symbol decoding selection circuitry 90. The three tri-state data buffers A82, B82 and C82 are used for selectively asserting the postcoded symbol decoding results from the postcoding comb filters A26, B26 and C26, respectively, onto the data bus 800.

It is to be determined whether any of the responses of the NTSC-rejection filters A100, B100 and C100 has substantially less energy than the response of the lowpass filter 54 to determine that one of the three tri-state data buffers A82, B82 and C82, rather than the tri-state data buffer 082, is to be conditioned for providing low source impedance when the NOR gate 92 response is ONE. If such determination is made it is to be further determined which of the responses of the NTSC-rejection filters A100, B100 and C100 has the least remaining energy therein, to govern which of the three tri-state data buffers 082, A82, B82 and C82 is to be conditioned for providing low source impedance when the NOR gate 92 response is ONE. Towards these goals, the responses of squarers 104 and A102 are compared by a comparator 106; the responses of squarers 104 and B102 are compared by a comparator 108; the responses of squarers 104 and C102 are compared by a comparator 110; the responses of squarers A102 and B102 are compared by a comparator 112; the responses of squarers A102 and C102 are compared by a comparator 114; and the responses of squarers B102 and C102 are compared by a comparator 112.

A 3-input NOR gate 118 responds to none of the comparators 106, 108 and 110 indicating that the response of squarer 104 exceeds any of the responses of the squarers A102, B102 and C102 to furnish a ONE as output signal; otherwise the NOR gate 118 output signal is a ZERO. A 2-input AND gate 120 supplies a ONE response that conditions the three tri-state data buffer 082 for providing low source impedance when and only when NOR gate 92 response is ONE at the same time that the NOR gate 118 response is a ONE.

A 3-input AND gate 122 furnishes a ONE output signal responsive to the output of the comparator 106 being a ONE, indicative that the squarer A102 response has less energy than the squarer 104 response, at the same time both of the complemented outputs of the comparators 112 and 114 are ONEs, indicative that the response of squarer 104 has no more energy than the responses of the squarers B102 and C102; otherwise the AND gate 122 output signal is a ZERO. A 2-input AND gate 124 supplies a ONE response that conditions the three tri-state data buffer A82 for providing low source impedance when and only when NOR gate 92 response is ONE at the same time that the AND gate 122 response is a ONE.

A 3-input AND gate 126 furnishes a ONE output signal responsive to the complemented output of the comparator 116 being a ONE, indicative that the squarer B102 response has no more energy than the squarer C102 response, at the same both of the outputs of the comparators 108 and 112 are ONEs, indicative that the response of squarer B102 has less energy than the responses of the squarers 104 and A102; otherwise the AND gate 126 output signal is a ZERO. A 2-input AND gate 128 supplies a ONE response that conditions the three tri-state data buffer B82 for providing low source impedance when and only when NOR gate 92 response is ONE at the same time that the AND gate 126 response is a ONE.

A 3-input AND gate 130 furnishes a ONE output signal when the outputs of the comparators 110, 114 and 116 are all ONEs, indicative that the response of squarer C102 has less energy than the responses of the squarers 104, A102 and B102; otherwise the AND gate 130 output signal is a ZERO. A 2-input AND gate 132 supplies a ONE response that conditions the three tri-state data buffer C82 for providing low source impedance when and only when NOR gate 92 response is ONE at the same time that the AND gate 130 response is a ONE.

Referring back to FIG. 14, the NTSC-rejection comb filter A20 and the postcoding comb filter A26 circuitry are advantageously chosen to be of types like the NTSC-rejection comb filter 520 and the postcoding comb filter 526 circuitry of FIG. 13. This is so despite a considerable cost in memory, since 718,200 symbols have to be stored in each of the 2-video-frame delays 5201 and 5263. (However, the storage in the 2-video-frame delay 5201 provides the storage required for the FIG. 15 co-channel interference detector A44. Furthermore, the same memory can be used for realizing the shorter delays 4201, 3201, 2201, 1201 and the shorter delays in the other co-channel interference detectors of FIG. 15. Also, the storage in the 2-video-frame delay 5263 provides the storage required for shorter delays 4263, 3263, 2263, 1263.)

The high-energy demodulation artifacts generated in response to analog TV synchronizing pulses, equalizing pulses, and color bursts are all suppressed when the NTSC-rejection comb filter A20 additively combines alternate video frames. Also, artifacts arising from the video content of the analog TV signal that does not change over two frames are suppressed, getting rid of stationary patterns irrespective of their spatial frequency or color. When NTSC-rejection comb filter A20 additively combines alternate video frames, the NTSC-rejection comb filter A100 differentially combines those alternate video frames and together with the squarer A102 provides a detector for change between alternate frames in the NTSC co-channel interference.

The remaining problem of suppressing demodulation artifacts primarily concerns suppressing those demodulation artifacts arising from frame-to-frame difference at certain pixel locations within the analog TV signal raster. These demodulation artifacts can be suppressed by intra-frame filtering techniques. The NTSC-rejection comb filter B20 and the postcoding comb filter B26 circuitry can be chosen to suppress remnant demodulation artifacts by relying on correlation in the horizontal direction, and the NTSC-rejection comb filter C20 and the postcoding comb filter C26 circuitry can be chosen to suppress remnant demodulation artifacts by relying on correlation in the vertical direction. Consider how such a design decision can be further implemented.

If the sound carrier of a co-channel interfering analog TV signal is not suppressed by SAW filtering or a sound trap in the IF amplifier chain 12, the NTSC-rejection comb filter B20 and the postcoding comb filter B26 circuitry are advantageously chosen to be of types like the NTSC-rejection comb filter 120 and the postcoding comb filter 126 circuitry of FIG. 9. If the sound carrier of a co-channel interfering analog TV signal is suppressed by SAW filtering or a sound trap in the IF amplifier chain 12, the NTSC-rejection comb filter B20 and the postcoding comb filter B26 circuitry are advantageously chosen to be of types like the NTSC-rejection comb filter 220 and the postcoding comb filter 226 circuitry of FIG. 10. This is because the anti-correlation between video components only six symbol epochs away from each other is usually better than the correlation between video components twelve symbol epochs away from each other.

The optimal choice of the NTSC-rejection comb filter C20 and the postcoding comb filter C26 circuitry is less straightforward, because of the choice one must make (in consideration of field interlace in the interfering analog TV signal) whether to choose the temporally closer scan line in the same field or the spatially closer line in the preceding field to be combined with the current scan line in the NTSC-rejection comb filter C20. Choosing the temporally closer scan line in the same field is generally the better choice, since jump cuts between fields are less likely to ravage NTSC rejection by the comb filter C20. With such choice, the NTSC-rejection comb filter C20 and the postcoding comb filter C26 circuitry are of types like the NTSC-rejection comb filter 320 and the postcoding comb filter 326 circuitry of FIG. 11. When NTSC-rejection comb filter C20 additively combines alternate scan lines of video, the NTSC-rejection comb filter C100 differentially combines those alternate scan lines of video and together with the squarer C102 provides a detector for change between alternate scan lines in the NTSC co-channel interference.

With the other choice instead, the NTSC-rejection comb filter C20 and the postcoding comb filter C26 circuitry are of types like the NTSC-rejection comb filter 420 and the postcoding comb filter 426 circuitry of FIG. 12. The NTSC-rejection comb filter C100 and the squarer C102 together then provide a detector for change between fields in the NTSC co-channel interference.

The FIG. 14 digital receiver apparatus is modified in yet other embodiments of the invention to use additional parallel data-slicing operations, each carried out by a cascade connection of respective NTSC-rejection filter followed by a respective even-level data-slicer followed by a respective postcoding comb filter. While two additional parallel data-slicing operations are shown in FIG. 14, modifications to use still further parallel data-slicing operations can provide capability for refining the best estimate of correct symbol decoding result still further.

The trellis decoder circuitry 34 may be replicated and the relative success of various symbol decoding decisions can be compared to refine the best estimate of symbol decoding result further. This involves considerably more digital hardware, however.

In certain embodiments of the invention alternative to those previously described, the symbol decoding selection circuitry 90 includes voting circuitry for polling the symbol codes supplied from the odd-level data-slicer 22, the postcoding comb filter A26 of first type, the postcoding comb filter B26 of second type, and the postcoding comb filter C26 of third type. If all four of the symbol decoding results concur, the symbol decoding result concurred to is supplied to the data assembler 30. If the symbol decoding results supplied from the odd-level data-slicer 22, the postcoding comb filter A26 of first type, the postcoding comb filter B26 of second type, and the postcoding comb filter C26 of third type do not concur a simple voting procedure is carried out by the voting circuitry to select the decoding result least likely to be in error.

More accurate symbol decoding will be obtained more of the time if a weighted voting procedure is followed in the voting circuitry. The weights for voting can be modified to take into account the variances of the decoding results, reducing the weight accorded a decoding result in the voting procedure if it departs from a decoding result concurred in by a majority of the other symbol decoding circuits. Using circuitry similar to some of the circuitry shown in FIG. 15B and some additional circuitry, weights for voting can also be determined in inverse relationships to the energy measurements generated by the squarer 104, by the NTSC-rejection comb filter A100 and the squarer A102, by the NTSC-rejection comb filter B100 and the squarer B102, and by the NTSC-rejection comb filter C100 and the squarer C102.

Co-channel interference by analog television signals of other standards than NTSC, such as the PAL standard, may arise in digital television systems adapted from the digital television system used for terrestrial broadcasting in the United States of America. The invention is readily modified as a mere matter of design to accommodate such co-channel interference.

One skilled in the art of digital communications receiver design and acquainted with the foregoing specification and its drawing will be enabled to design many embodiments of the invention other than the preferred ones specifically described. This should be borne in mind when construing the scope of the broader claims which follow. In the claims which follow, the word "said" is used whenever reference is made to an antecedent, and the word "the" is used for grammatical purposes other than to refer back to an antecedent.

What is claimed is:

1. A method of symbol decoding a stream of 2N-level symbols each having a symbol epoch of a specified length in time, which said stream of 2N-level symbols is susceptible to being accompanied by artifacts of co-channel interfering analog television signal, N being a positive integer, said method generating selected symbol decoding results and comprising the steps of:

comb filtering said stream of 2N-level symbols to generate a comb filter response with (4N–1)-level precoded symbols from which any said artifacts of co-channel interfering analog television signal are suppressed, said step of comb filtering including substeps of delaying said stream of 2N-level symbols by a prescribed number of said symbol epochs to generate a delayed stream of 2N-level symbols and linearly combining said stream of 2N-level symbols and said delayed stream of 2N-level symbols, in accordance with one of additive and subtractive procedures, to generate first linear combining results as said comb filter response with (4N–1)-level precoded symbols;

data-slicing said comb filter response with (4N–1)-level precoded symbols to generate precoded symbol decoding results;

delaying selected symbol decoding results by said prescribed number of said symbol epochs to generate delayed selected symbol decoding results;

linearly combining said precoded symbol decoding results with said delayed selected symbol decoding results for generating second linear combining results, said step of linearly combining said precoded symbol decoding results with said delayed selected symbol decoding results being performed in accordance with an opposite of said additive and subtractive procedures from said one of said additive and subtractive procedures used in said substep of linearly combining said stream of 2N-level symbols and said delayed stream of 2N-level symbols to generate said first linear combining results, said opposite of said additive and subtractive procedures performed according to a modular arithmetic;

determining when symbol coding descriptive of synchronization data occurs in said stream of 2N-level symbols;

regenerating said synchronization data without error when said symbol coding descriptive of said synchronization data occurs in said stream of 2N-level symbols; and generating said selected symbol decoding results so as to correspond to said synchronization data without error when said symbol coding descriptive of said synchronization data occurs in said stream of 2N-level symbols and so as to correspond to said second linear combining results at least during selected times when symbol coding that is not descriptive of said synchronization data occurs in said stream of 2N-level symbols.

2. The method of symbol decoding set forth in claim 1 included in a method of symbol decoding said stream of 2N-level symbols for generating final symbol decoding results in which artifacts of co-channel interfering analog television signal are automatically suppressed during symbol decoding, said method for generating final symbol decoding results further including the steps of:

data-slicing said stream of 2N-level symbols to generate interim symbol decoding results;

determining whether or not said stream of 2N-level symbols is accompanied by artifacts of co-channel interfering analog television signal that are of sufficient strength to cause substantial error in said interim symbol decoding results;

including said interim symbol decoding results in said final symbol decoding results responsive to determination that said stream of 2N-level symbols is not accompanied by artifacts of co-channel interfering analog television signal that are of sufficient strength to cause substantial error in said interim symbol decoding results; and responsive to determination that said stream of 2N-level symbols is accompanied by artifacts of co-channel interfering analog television signal that are of sufficient strength to cause substantial error in said interim symbol decoding results causing said final symbol decoding results to correspond to said selected symbol decoding results.

3. The method for generating final symbol decoding results set forth in claim 2; wherein, responsive to determination that said stream of 2N-level symbols is not accompanied by artifacts of co-channel interfering analog television signal that are of sufficient strength to cause substantial error in said interim symbol decoding results, said interim symbol decoding results are included in said final symbol decoding results only during said selected times when symbol coding that is not descriptive of said synchronization data occurs in said stream of 2N-level symbols; and wherein there is included a further step of:

causing said final symbol decoding results to correspond to said synchronization data without error, when symbol coding that is descriptive of said synchronization data occurs in said stream of 2N-level symbols.

4. The method for generating final symbol decoding results set forth in claim 3, wherein said step of determining whether or not said stream of 2N-level symbols is accompanied by artifacts of co-channel interfering analog television signal that are of sufficient strength to cause substantial error in said interim symbol decoding results comprises the substeps of:

differentially combining said interim symbol decoding results and said second linear combining results to generate a difference signal;

determining the energy of said difference signal; and detecting when the energy of said difference signal exceeds a prescribed threshold value, thereby determining that said stream of 2N-level symbols is accompanied by artifacts of co-channel interfering analog television signal that are of sufficient strength to cause substantial error in said interim symbol decoding results; and detecting when the energy of said difference signal does not exceed said prescribed threshold value, thereby determining that said stream of 2N-level symbols is not accompanied by artifacts of co-channel interfering analog television signal that are of sufficient strength to cause substantial error in said interim symbol decoding results.

5. The method for generating final symbol decoding results set forth in claim 3, wherein said step of determining whether or not said stream of 2N-level symbols is accompanied by artifacts of co-channel interfering analog television signal that are of sufficient strength to cause substantial error in said interim symbol decoding results comprises the substeps of:

differentially combining said interim symbol decoding results and said second linear combining results to generate a difference signal;

squaring said difference signal to generate a squared difference signal;

generating a mean average of said squared difference signal;

detecting when said mean average exceeds a prescribed threshold value, thereby determining that said stream of 2N-level symbols is accompanied by artifacts of co-channel interfering analog television signal that are of sufficient strength to cause substantial error in said interim symbol decoding results; and detecting when said rectified lowpass filtering response does not exceed said prescribed threshold value, thereby determining that said stream of 2N-level symbols is not accompanied by artifacts of co-channel interfering analog television signal that are of sufficient strength to cause substantial error in said interim symbol decoding results.

6. The method for generating final symbol decoding results set forth in claim 2 employed with a digital television receiver generating said stream of 2N-level symbols by demodulation of amplified intermediate-frequency signals, which intermediate-frequency signals are generated by frequency conversion of digital television signals, wherein said step of determining whether or not said stream of 2N-level symbols is accompanied by artifacts of co-channel interfering analog television signal that are of sufficient strength to cause substantial error in said interim symbol decoding results comprises the substeps of:

generating intermediate-frequency signals by frequency conversion of digital television signals;

amplifying said intermediate-frequency signals to supply amplified intermediate-frequency signals;

synchronously detecting said amplified intermediate-frequency signals at a video carrier frequency of said co-channel interfering analog television signal, in a complex demodulation process for generating in-phase and quadrature-phase synchronous video detection responses;

separating a video component of said co-channel interfering analog television signal from said in-phase and quadrature-phase synchronous video detection responses;

determining the energy of the separated video component of said co-channel interfering analog television signal;

detecting when the energy of said separated video component of said co-channel interfering analog television signal exceeds a prescribed threshold value, thereby determining that said stream of 2N-level symbols is accompanied by artifacts of co-channel interfering analog television signal that are of sufficient strength to cause substantial error in said interim symbol decoding results; and detecting when said rectified lowpass filtering response does not exceed said prescribed threshold value, thereby determining that said stream of 2N-level symbols is not accompanied by artifacts of co-channel interfering analog television signal that are of sufficient strength to cause substantial error in said interim symbol decoding results.

7. The method for generating final symbol decoding results set forth in claim 2 employed with a digital television receiver generating said stream of 2N-level symbols by demodulation of amplified intermediate-frequency signals, which intermediate-frequency signals are generated by frequency conversion of digital television signals, wherein said step of determining whether or not said stream of 2N-level symbols is accompanied by artifacts of co-channel interfering analog television signal that are of sufficient strength to cause substantial error in said interim symbol decoding results comprises the substeps of:

generating intermediate-frequency signals by frequency conversion of digital television signals;

amplifying said intermediate-frequency signals to supply amplified intermediate-frequency signals including the modulated video and audio carriers of said co-channel interfering analog television signal;

detecting an intercarrier sound signal responsive to heterodyne between the modulated video and audio carriers of said co-channel interfering analog television signal included in said amplified intermediate-frequency signals determining the energy of said intercarrier sound signal;

detecting when the energy of said intercarrier sound signal exceeds a prescribed threshold value, thereby determining that said stream of 2N-level symbols is accompanied by artifacts of co-channel interfering analog television signal that are of sufficient strength to cause substantial error in said interim symbol decoding results; and detecting when the energy of said intercarrier sound signal does not exceed said prescribed threshold value, thereby determining that said stream of 2N-level symbols is not accompanied by artifacts of co-channel interfering analog television signal that are of sufficient strength to cause substantial error in said interim symbol decoding results.

8. The method of symbol decoding set forth in claim 1, wherein said substep of linearly combining said stream of 2N-level symbols and said delayed stream of 2N-level symbols in said step of comb filtering is a subtractive procedure, and wherein said step of linearly combining said precoded symbol decoding results with said delayed selected symbol decoding results is an additive procedure carried out in a modulo-2N arithmetic.

9. The method of symbol decoding set forth in claim 8, wherein said prescribed umber of said symbol epochs is twelve.

10. The method of symbol decoding set forth in claim 1, wherein said substep of linearly combining said stream of 2N-level symbols and said delayed stream of 2N-level symbols in said step of comb filtering is an additive procedure, and wherein said step of linearly combining said precoded symbol decoding results with said delayed selected symbol decoding results is a subtractive procedure carried out in a modulo2N arithmetic.

11. The method of symbol decoding set forth in claim 10, wherein said prescribed number of said symbol epochs is six.

12. The method of symbol decoding set forth in claim 10, wherein said prescribed number of said symbol epochs is substantially equal to the duration of two horizontal scanning lines of said co-channel interfering analog television signal.

13. The method of symbol decoding set forth in claim 10, wherein said prescribed number of said symbol epochs is substantially equal to the duration of two hundred sixty-two horizontal scanning lines of said co-channel interfering analog television signal.

14. The method of symbol decoding set forth in claim 10, wherein said prescribed number of said symbol epochs is substantially equal to the duration of two video frames of said co-channel interfering analog television signal.

15. In combination:

digital television signal detection apparatus for supplying a stream of 2N-level symbols each having a symbol epoch of a specified length in time, which stream is susceptible to being accompanied by artifacts of co-channel interfering analog television signal;

a first delay device for exhibiting a delay of a prescribed first number of said symbol epochs, connected to respond to said stream of 2N-level symbols with a first delayed stream of 2N-level symbols, thereby to generate a first pair of differentially delayed streams of said 2N-level symbols;

a first linear combiner which linearly combines said first pair of differentially delayed streams of said 2N-level symbols susceptible to being accompanied by artifacts of co-channel interfering analog television signal, received as first and second respective input signals of said first linear combiner, to generate a first stream of (4N−1)-level symbols as an output signal of said first linear combiner, said first stream of (4N−1)-level symbols providing a first comb filter response in which said artifacts of co-channel interfering analog television signal are suppressed;

a first data slicer decoding said first stream of (4N−1)-level symbols supplied as respective output signal from said first linear combiner, for generating first precoded symbol decoding results;

a second linear combiner which linearly combines respective first and second input signals received thereby for supplying a respective output signal therefrom, said second linear combiner connected to receive said first precoded symbol decoding results as said respective first input signal thereof, one of said first and said second linear combiners being an adder and the other of said first and said second linear combiners being a subtractor;

a second delay device connected for delaying a respective input signal thereof said prescribed first number of symbol epochs to generate said second input signal of aid second linear combiner;

data synchronization circuitry for determining when symbols used for data synchronization appear in said stream of 2N-level symbols;

circuitry for generating ideal symbol decoding results when symbols used for data synchronization are determined to appear in said stream of 2N-level symbols;

a plural-input first multiplexer connected for supplying a respective output signal therefrom to said second delay device as said second input signal thereof, for receiving said ideal symbol decoding results as a first of its input signals, and for receiving said output signal of said second linear combiner as another of its input signals, said first multiplexer being conditioned to reproduce as its output signal the first of its input signals when and only when symbols used for data synchronization are determined to appear in said stream of 2N-level symbols and otherwise being conditioned at least at selected times to reproduce said output signal of said second linear combiner as first postcoded symbol decoding results.

16. The combination of claim 15, further comprising:

a second data slicer decoding said stream of 2N-level symbols for generating interim symbol decoding results supplied to said first multiplexer as a second input signal thereof, said output signal of said second linear combiner being supplied to said first multiplexer as a third input signal thereof; and NTSC co-channel interference detection circuitry for determining whether or not said stream of 2N-level symbols is accompanied by artifacts of co-channel interfering analog television signal as will cause uncorrectable error in said interim symbol decoding results generated by said second data slicer, said first multiplexer being conditioned to reproduce said second of its input signals when said NTSC co-channel interference detection circuitry determines said stream of 2N-level symbols is not accompanied by artifacts of co-channel interfering analog television signal as will cause uncorrectable error in said interim symbol decoding results, and said first multiplexer being conditioned to reproduce said third of its input signals when said NTSC co-channel interference detection circuitry determines said stream of 2N-level symbols is accompanied by artifacts of co-channel interfering analog television signal as will cause uncorrectable error in said interim symbol decoding results.

17. The combination of claim 16, further comprising:

a third delay device exhibiting a delay of a prescribed second number of said symbol epochs, connected to respond to said stream of 2N-level symbols with a second delayed stream of 2N-level symbols, thereby to generate a second pair of differentially delayed streams of said 2N-level symbols;

a third linear combiner which linearly combines said second pair of differentially delayed streams of said 2N-level symbols susceptible to being accompanied by artifacts of co-channel interfering analog television signal, received as first and second respective input signals of said third linear combiner, to generate a second stream of (4N−1)-level symbols as an output signal of said third linear combiner, said second stream of (4N−1)-level symbols providing a second comb filter response in which said artifacts of co-channel interfering analog television signal are suppressed;

a fourth linear combiner which linearly combines respective first and second input signals received thereby for supplying a respective output signal therefrom to said first multiplexer as a further input signal thereof, one of said third and said fourth linear combiners being an adder and the other of said first and said second linear combiners being a subtractor;

a third data slicer decoding said second stream of (4N−1)-level symbols supplied as respective output signal from said third linear combiner, for generating second precoded symbol decoding results applied to said fourth linear combiner as said respective first input signal thereof; and a fourth delay device connected for delaying the output signal of said first multiplexer said prescribed second number of symbol epochs to generate said second input signal of said fourth linear combiner.

18. The combination of claim 15, wherein said first multiplexer is a two-input multiplexer conditioned to reproduce said another of its input signals as its said output signal when not conditioned to reproduce said first of its input signals as its said output signal, said combination further comprising:

a second data slicer decoding said stream of 2N-level symbols for generating interim symbol decoding results supplied to said first multiplexer as a second input signal thereof, said output signal of said second linear combiner being supplied to said first multiplexer as a third input signal thereof;

NTSC co-channel interference detection circuitry for determining whether or not said stream of 2N-level symbols is accompanied by artifacts of co-channel interfering analog television signal as will cause uncorrectable error in said interim symbol decoding results generated by said second data slicer; and a plural-input second multiplexer connected for supplying a respective output signal therefrom reproducing a respective input signal thereof as final symbol decoding results, for receiving said interim symbol decoding results as a first input signal thereof, and for receiving said output signal of said first multiplexer as another input signal thereof, said multiplexer being conditioned to reproduce said first of its input signals when and only when said NTSC co-channel interference detection circuitry determines said stream of 2N-level symbols is not accompanied by artifacts of co-channel interfering analog television signal as will cause uncorrectable error in said interim symbol decoding results, and said second multiplexer being conditioned to reproduce said other input signal thereof when said NTSC co-channel interference detection circuitry determines said stream of 2N-level symbols is accompanied by artifacts of co-channel interfering analog television signal as will cause uncorrectable error in said interim symbol decoding results.

19. The combination of claim 15, wherein said first linear combiner is a subtractor and said second linear combiner is a modulo-2N adder.

20. The combination of claim 19, wherein said prescribed first number of symbol epochs is twelve.

21. The combination of claim 15, wherein said first linear combiner is an adder and said second linear combiner is a modulo-2N subtractor.

22. The combination of claim 21, wherein said prescribed first number of symbol epochs is six.

23. The combination of claim 21, wherein said prescribed first number of symbol epochs is substantially equal to the number of symbol epochs in two horizontal scan lines of said co-channel interfering analog television signal.

24. The combination of claim 21, wherein said prescribed first number of symbol epochs is one-thousand three hundred sixty-eight.

25. The combination of claim 21, wherein said prescribed first number of symbol epochs is substantially equal to the number of symbol epochs in two hundred sixty-two horizontal scan lines of said co-channel interfering analog television signal.

26. The combination of claim 21, wherein said prescribed first number of symbol epochs is one hundred seventy-nine thousand two hundred eight.

27. The combination of claim 21, wherein said prescribed first number of symbol epochs is substantially equal to the number of symbol epochs in two video frames of said co-channel interfering analog television signal.

28. The combination of claim 21, wherein said prescribed first number of symbol epochs is seven hundred eighteen thousand two hundred.

* * * * *